(12) United States Patent
Aoki et al.

(10) Patent No.: US 6,612,610 B1
(45) Date of Patent: Sep. 2, 2003

(54) AIR BAG DEVICE

(75) Inventors: Takashi Aoki, Wako (JP); Naohiko Saita, Wako (JP); Takashi Honda, Wako (JP); Hiroyuki Ito, Wako (JP); Yuichi Saitoh, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/397,504

(22) Filed: Sep. 17, 1999

(30) Foreign Application Priority Data

| Sep. 18, 1998 | (JP) | ............................................. 10-265118 |
| Sep. 18, 1998 | (JP) | ............................................. 10-265119 |
| Sep. 18, 1998 | (JP) | ............................................. 10-265121 |

(51) Int. Cl.$^7$ ............................................. B60R 21/16
(52) U.S. Cl. ................................. 280/730.2; 280/743.1
(58) Field of Search ........................... 280/728.2, 730.2, 280/732, 743.1

(56) References Cited

U.S. PATENT DOCUMENTS

| 5,533,750 A | * | 7/1996 | Karlow et al. | ............ | 280/730.2 |
| 5,833,263 A | * | 11/1998 | Wittmann et al. | ........ | 280/728.3 |
| 5,890,732 A | * | 4/1999 | Nakamura et al. | ........... | 280/729 |
| 5,895,070 A | * | 4/1999 | Crimmins et al. | ........ | 280/730.2 |
| 5,906,395 A | * | 5/1999 | Isaji et al. | ................ | 280/743.1 |
| 5,913,536 A | * | 6/1999 | Brown | ..................... | 280/730.2 |
| 5,988,674 A | * | 11/1999 | Kimura et al. | ............ | 280/730.2 |
| 5,997,037 A | * | 12/1999 | Hill et al. | ................ | 280/743.2 |
| 6,059,311 A | * | 5/2000 | Wipasuramonton et al. | ........................... | 280/729 |
| 6,065,772 A | * | 5/2000 | Yamamoto et al. | ....... | 280/730.2 |
| 6,073,959 A | * | 6/2000 | Heinz et al. | ................ | 280/729 |
| 6,086,091 A | * | 7/2000 | Heinz et al. | ............. | 280/728.3 |
| 6,142,507 A | * | 11/2000 | Okuda et al. | ............ | 280/730.2 |
| 6,149,185 A | * | 11/2000 | White, Jr. et al. | ........ | 280/728.2 |

FOREIGN PATENT DOCUMENTS

| JP | 5-16751 | 1/1993 |
| JP | 10-129382 | 5/1998 |
| JP | 11-59311 | 3/1999 |
| JP | 11-78767 | 3/1999 |

\* cited by examiner

*Primary Examiner*—Lesley D. Morris
*Assistant Examiner*—L. Lum
(74) *Attorney, Agent, or Firm*—Armstrong, Westerman & Hattori, LLP

(57) ABSTRACT

An air bag device includes an inflater having a retainer retained thereon and being inserted into a folded air bag through a slit defined in the air bag and then, a protector sheet is wound around an outer periphery of the folded air bag. The air bag device is secured by a bolt inserted through the superposed retainer, air bag and protector sheet and fastened by a nut. The slit in the air bag is covered with the protector sheet and closed thereby, whereby the slit can be closed without provision of a special closing member to prevent leakage of a high-pressure gas from the inflater.

14 Claims, 18 Drawing Sheets

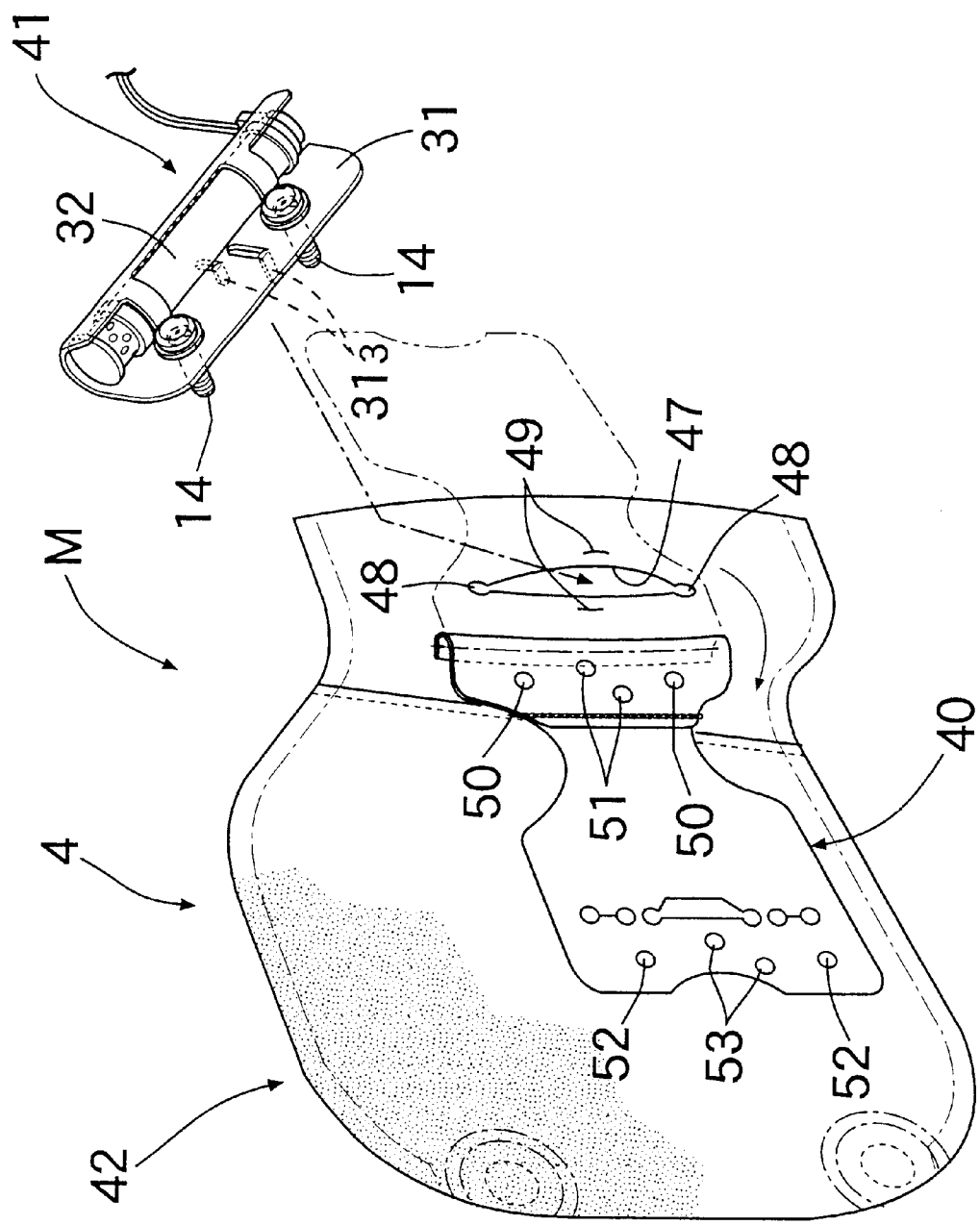

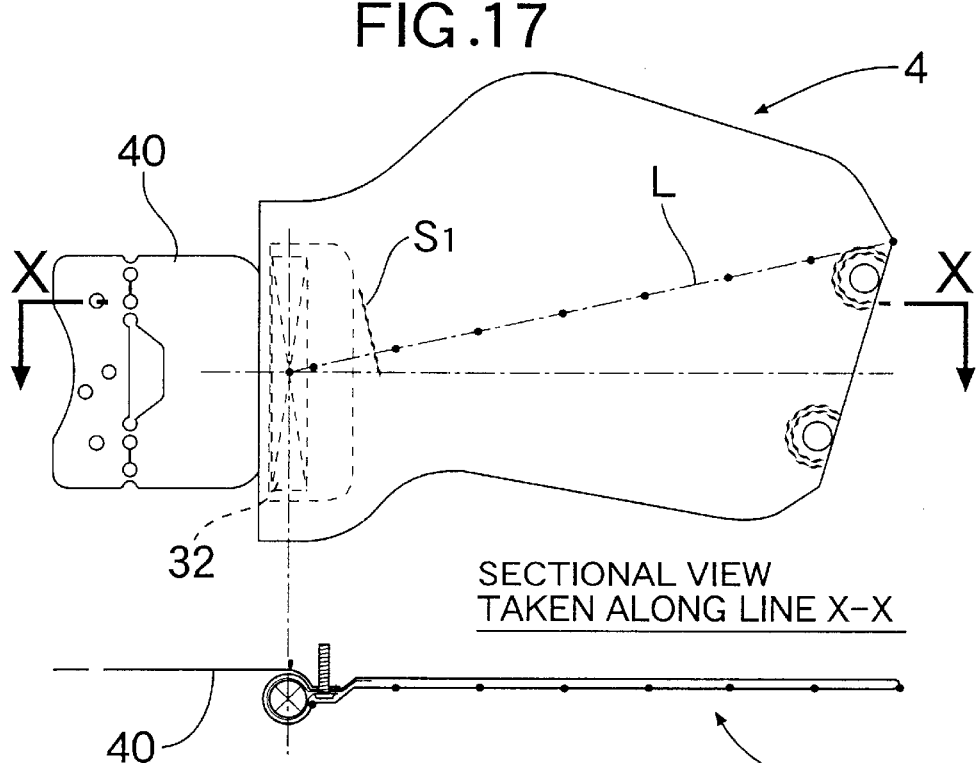
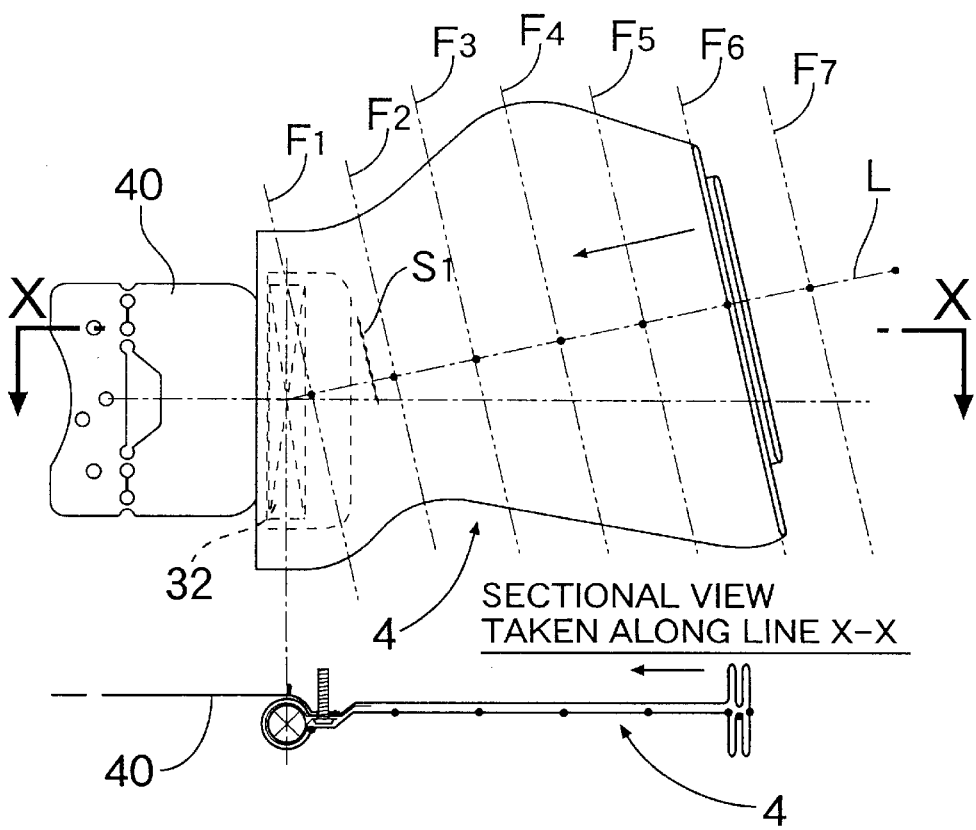

SECTIONAL VIEW
TAKEN ALONG LINE X-X

AIR BAG DEVICE

BACKGROUND OF THE INVENTION

1. Field of the Invention

The present invention relates to an air bag device including an air bag which is deployed into a vehicle compartment by a high-pressure gas generated by an inflater upon collision of a vehicle to hold back an occupant.

2. Description of the Related Art

In such air bag device, if the inflater for generating the high-pressure gas is disposed outside the air bag, a gas passage interconnecting the inflater and the air bag is required, resulting in an increase in the number of parts. Therefore, there is a conventionally known air bag device in which an inflater is disposed within an air bag to eliminate the need for the gas passage. In this case, a slit is defined in a base end of the air bag. The inflater is inserted through the slit into the air bag and fixed therein. Then the slit is closed, thereby preventing leakage of high-pressure gas from the air bag.

If the slit in the air bag is closed by sewing, there is a problem that the number of sewing steps is increased, causing an increase in cost. If the slit is closed in such a manner that it is covered with a special closing member, there is a problem that the number of parts is increased by the closing member and the number of assembling steps is also increased, likewise causing an increase in cost.

There is also an air bag device which is already known from Japanese Patent Application Laid-open No.10-129382, and in which a subassembly comprised of an air bag and an integrally formed inflater is accommodated in a case body of a module case, so that a lid covering the case body is opened upon collision of a vehicle, thereby permitting the air bag to be deployed into a vehicle compartment. The module case is closed by bringing hooks formed on the case body into engagement in hook-engaging bores defined in the lid. When the air bag is expanded within the case body, it pushes an inner surface of the lid whereby the engagement of the hooks in the hook-engaging bores is released to cause the lid to be opened.

In the above known air bag device, an outer peripheral surface of the lid protrudes outwards from an outer peripheral surface of the case body in the vicinity of an opened edge of the case body to form a stepped portion. Therefore, when an external force is applied to the stepped portion, there is a possibility that the engagement of the hooks in the hook-engaging bores will be released, causing the lid to be opened.

There is also an air bag device used upon a side collision of a vehicle, which is already proposed in Japanese Patent Application No.9-237960 and in which an air bag is formed by double-folding a substantially band-shaped base fabric, otherwise referred to herein as a "ground fabric", along a central folding line and sewing end edges of the round fabric excluding the folding line. Further, there is a process for folding an air bag in an air bag device used upon a side collision of a vehicle, which is already proposed in Japanese Patent Application No. 9-226787, and which comprises folding the air bag in a bellows-shaped fashion in a longitudinal direction from a tip end toward a base end, and then folding upper and lower portions of the folded air bag in the vertical direction. Yet further, there is an air bag device used upon a side collision of a vehicle, which is already known from Japanese Patent Application Laid-open No. 5-16751 and in which a tether for stabilizing the shape of the air bag upon the expansion of the air bag is sewn to a ground fabric in a state in which the tether has been superposed onto a reinforcing fabric, thereby reinforcing the sewn portion.

When the end edge of the ground fabric double-folded along the central folding line is sewn, as in the air bag device proposed in Japanese Patent Application No.9-237960, it is necessary to stop the sewing line at a location short of the folding line of the ground fabric to treat the end of a sewing thread. For this reason, there is a possibility that an unsewn portion may be created in the vicinity of the folding line of the ground fabric, whereby the undesirable leakage of a gas from the unsewn portion may be generated upon the expansion of the air bag.

When the air bag is folded in a bellows-shaped fashion from the tip end toward the base end, as in the air bag device proposed in Japanese Patent Application No.9-226787, the folding operation can be automated for most of the air bag, but cannot be automated for the base end of the air bag in which the inflater is accommodated. Therefore, it is required that the folding operation for the base end of the air bag must be conducted manually. When the operation of folding the air bag in the bellows-shaped fashion is conducted manually, there is a problem that it is difficult to conduct a precise folding operation free of a dispersion, if a mark as a criterion does not exist on the air bag. However, the provision of a special mark for the manually folding operation is undesirable, because it causes an increase in cost.

When the sewn area between the ground fabric and the tether is reinforced with the reinforcing fabric as in Japanese Patent Application Laid-open No.5-16751, the number of parts is increased by the reinforcing fabric, likewise resulting in a problem that it causes an increase in cost.

SUMMARY OF THE INVENTION

Accordingly, it is a first object of the present invention to ensure that the slit defined in the air bag in order to accommodate the inflater is closed reliably without use of a special closing member.

It is a second object of the present invention to prevent the lid, which covers the case body of the module case of the air bag device, from being opened inadvertently.

It is a third object of the present invention to ensure that the air bag is sewn, so that the performance upon the expansion of the air bag and the operability of folding the air bag can be ensured.

To achieve the above object, according to a first aspect and feature of the present invention, there is provided an air bag device comprising an inflater which has a retainer retained thereon, and which is inserted into an air bag through a slit defined in a base end of the air bag, and a protector sheet wound around an outer periphery of the folded air bag, the slit in the air bag being closed by sandwiching the slit between the retainer and the protector sheet.

With the above arrangement, the slit defined in the base end of the air bag in order to insert the inflater having the retainer retained thereon into the air bag is closed by sandwiching it between the retainer and the protector sheet wound around the outer periphery of the folded air bag. Therefore, it is possible to prevent a high-pressure gas, generated by the inflater upon the expansion of the air bag, from being leaked through the slit without provision of a special member for closing the slit, whereby the air bag can be deployed reliably.

To achieve the second object, according to a second aspect and feature of the present invention, there is provided an air bag device comprising an air bag and an inflater for supplying a high-pressure gas to the air bag, the folded air bag and the inflater being accommodated in a module case comprising a case body which is openably and closably covered with a lid, a stepped portion formed in the vicinity of an opened edge of an outer periphery of the case body to stand back from an outer surface of the case body, a flange which is formed on an outer periphery of a lid and which is capable of being engaged with an outer periphery of the stepped portion, and a projection which is formed on a back of the lid and which is capable of being engaged with an inner surface of the opened edge of the case body, whereby the outer surface of the lid is positioned flush with the outer surface of the case body in a state in which the lid has been closed.

With the above arrangement, the stepped portion is formed in the vicinity of the opened edge of the outer periphery of the case body of the module case to stand back from the outer surface of the case body, and the flange capable of being engaged with the outer periphery of the stepped portion is formed on the outer periphery of the lid. Therefore, the case body and the lid are fitted with each other in socket-and-spigot type fitting, so that the outer surface of the lid is positioned flush with the outer surface of the case body. Thus, it is difficult for an external force to be applied to the flange of the lid, whereby the lid can be prevented from being opened inadvertently. Moreover, the projection capable of being engaged with the inner surface of the opened edge of the case body is formed on the back of the lid and therefore, the flange of the lid can be located reliably on the opened edge of the outer periphery of the case body to further reliably prevent the creation of a difference in level.

To achieve the third object, according to a third aspect and feature of the present invention, there is provided an air bag device comprising an air bag which is expanded by a high-pressure gas generated by an inflater upon collision of a vehicle to hold back an occupant, and which includes a sewing line extending along a double-overlapped end edge of a ground fabric double-folded along a central folding line, the air bag device including a patch fabric superposed onto the ground fabric to cover at least a portion in the vicinity of a tip end of the folding line, the sewing line extending on the patch fabric beyond the folding line.

With the above arrangement, when the ground fabric is sewn along the sewing line extending along the double-lapped end edge of the ground fabric double-folded along the central folding line, it is possible to prevent the sewing line from being ended at a location short of the folding line to leave an unsewn portion in the vicinity of the tip end of the folding line, thereby avoiding the leakage of the gas through the unsewn portion, because the sewing line extends on the patch fabric, superposed onto the ground fabric to cover a portion in the vicinity of the tip end of the folding line, beyond the folding line.

To achieve the third object, according to a fourth aspect and feature of the present invention, there is provided an air bag device comprising an air bag which is expanded by a high-pressure gas generated by an inflater upon collision of a vehicle to hold back an occupant, and which is made by superposing a reinforcing fabric onto a base end of a ground fabric and sewing the reinforcing fabric to the ground fabric along a sewing line, wherein the sewing line is disposed in parallel to a folding line along which the air bag is folded in a bellows-shaped fashion.

With the above arrangement, the sewing line, along which the reinforcing fabric is superposed and sewn onto the base end of the ground fabric, is disposed in parallel to the folding line along which the air bag is folded in the bellows-shaped fashion. Therefore, the air bag can be folded precisely using the sewing line as a mark. Moreover, it is unnecessary to provide a special mark and hence, an increase in the number of parts and an increase in cost can be avoided.

To achieve the third object, according to a fifth aspect and feature of the present invention, there is provided an air bag device comprising an air bag which is expanded by a high-pressure gas generated by an inflater upon collision of a vehicle to hold back an occupant, and which includes a tether for interconnecting opposed inner surfaces of a ground fabric to define the shape of the air bag upon the expansion of the air bag, wherein opposite ends of the tether are double-folded and sewn to the inner surface of the ground fabric.

With the above arrangement, the opposite ends of the tether interconnecting the opposed inner surfaces of the ground fabric to define the shape of the air bag upon the expansion of the air bag are double-folded and sewn to the inner surface of the ground fabric. Therefore, even if a strong tensile strength is applied to the opposite ends of the tether upon the expansion of the air bag, it is possible to reliably prevent the sewing line from being broken to break the ground fabric. Moreover, a special reinforcing fabric is not required and hence, an increase in the number of parts and an increase in cost can be avoided.

The above and other objects, features and advantages of the invention will become apparent from the following description of the preferred embodiments taken in conjunction with the accompanying drawings.

BRIEF DESCRIPTION OF THE DRAWINGS

FIGS. 1 to 22 show a first embodiment of the present invention, wherein

FIG. 1 is a perspective view of a seat provided with an air bag device;

FIG. 2 is an enlarged sectional view taken along a line 2—2 in FIG. 1;

FIG. 3 is a view taken in the direction of an arrow 3 in FIG. 2;

FIG. 4 is a sectional view taken along a line 4—4 in FIG. 3;

FIG. 5 is a sectional view taken along a line 5—5 in FIG. 3;

FIG. 6 is a sectional view taken along a line 6—6 in FIG. 3;

FIG. 8 is an exploded perspective view of an air bag module;

FIG. 9 is a view taken in the direction of an arrow 9 in FIG. 8;

FIG. 10 is a view taken in the direction of an arrow 10 in FIG. 8;

FIG. 11 is a sectional view taken along a line 11—11 in FIG. 9;

FIG. 12 is a sectional view taken along a line 12—12 in FIG. 9;

FIG. 13 is an enlarged view of a portion indicated by 13 in FIG. 9;

FIG. 14 is an enlarged view of a portion indicated by 14 in FIG. 9;

FIG. 15 is an enlarged view of a portion indicated by 15 in FIG. 9;

FIG. 16 is a view for explaining the operation during assembling of the air bag module;

FIGS. 17 to 22 are views showing a procedure for folding the air bag;

FIGS. 23 and 24 show a second embodiment of the present invention, wherein

FIG. 23 is a front view of an air bag for a driver's seat; and

FIG. 24 is a sectional view taken along a line 24—24 in FIG. 23.

DESCRIPTION OF THE PREFERRED EMBODIMENT

A first embodiment of the present invention will now be described with reference to FIGS. 1 to 22.

Figure 1:
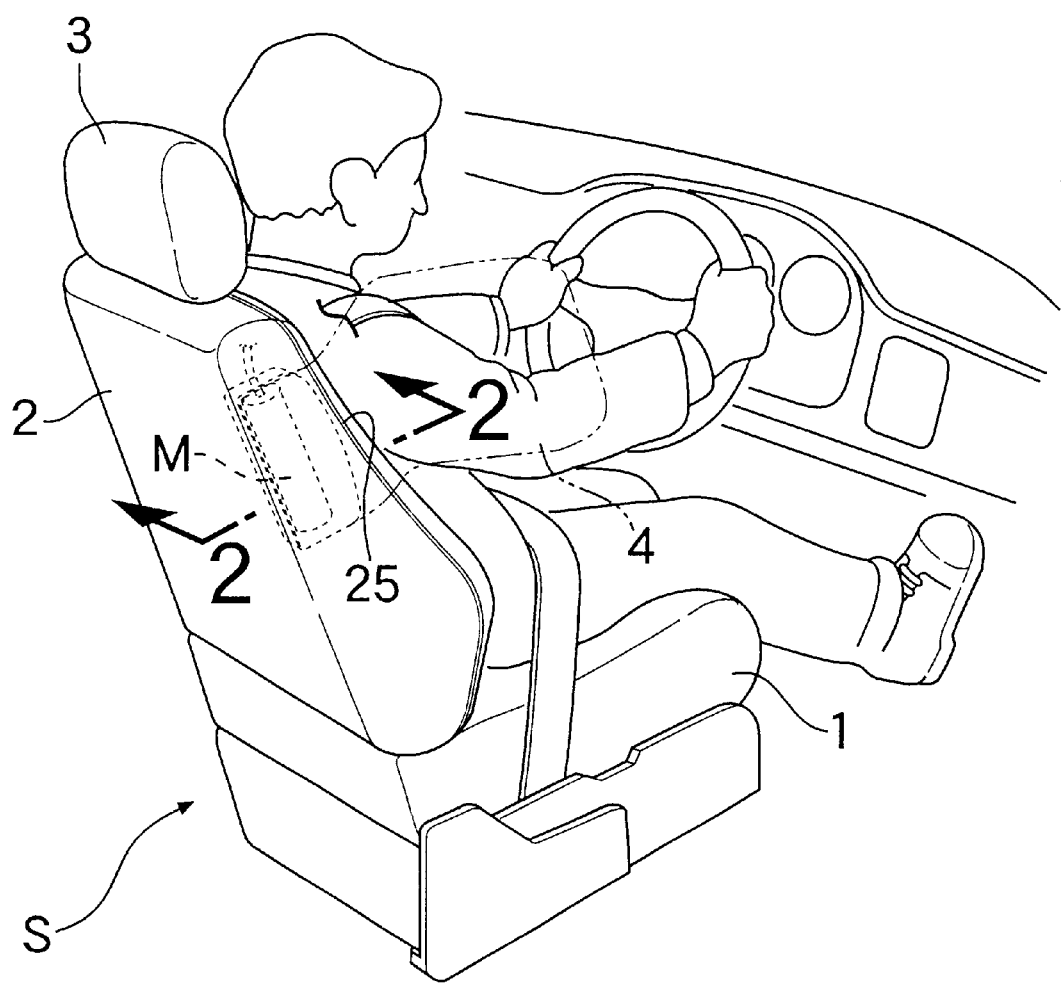

As shown in FIG. 1, a right front seat S in an automobile is comprised of a seat cushion 1 disposed substantially horizontally, a seat back 2 extending rearwardly and upwardly from a rear end of the seat cushion 1, and a head rest 3 mounted at an upper end of the seat back 2. An air bag module M is accommodated in a right portion of the inside of the seat back 2 of the front seat S. When the air bag module M is operated, an air bag 4 breaks a sewn portion 25 of the seat back 2 to force it open, and is thus deployed obliquely forwards, so that it is interposed between a right side of an occupant sitting on the front seat S and a center pillar, as well as a front door (both not shown).

Figure 2:
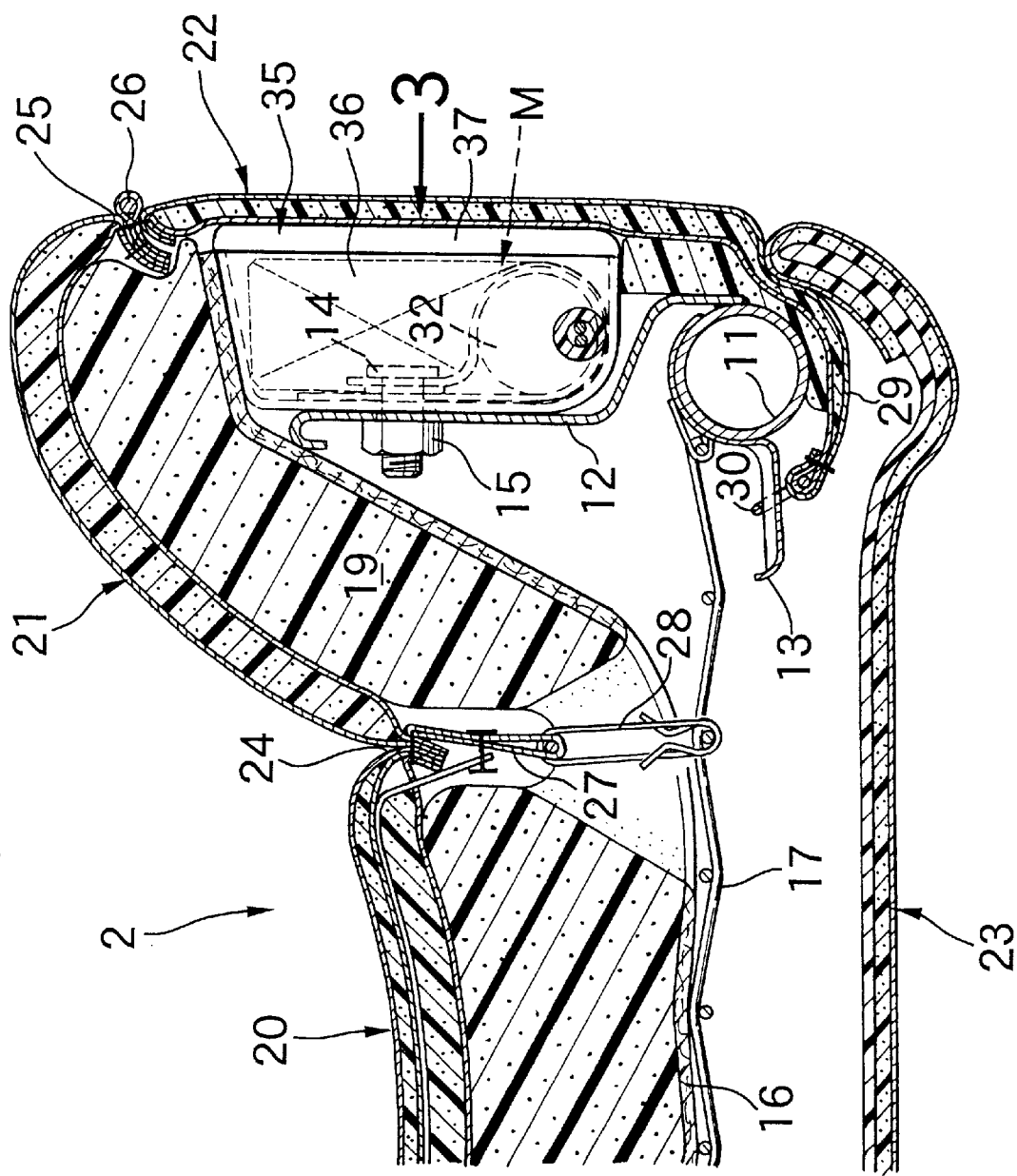
Figure 3:
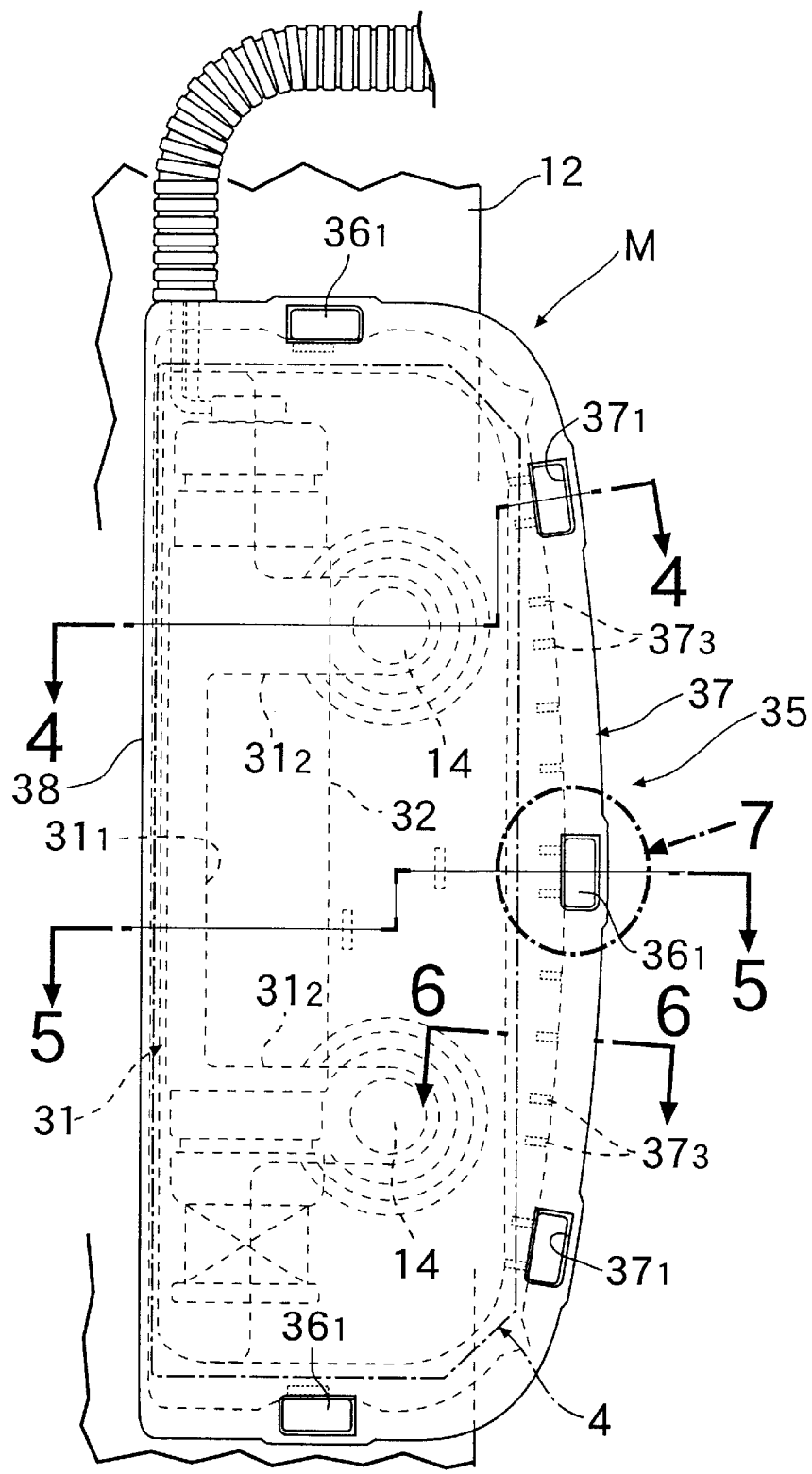

As can be seen from FIG. 2, a module mounting frame 12 made of a metal and extending forwardly of a vehicle body and a retainer 13 made of a metal and extending inwardly of the vehicle body are fixed by welding to a pipe frame 11 extending upwardly and downwardly along a right side edge of the seat back 2. The air bag module M is fixed to a right side of the module mounting frame 12 by two bolts 14, 14 and two nuts 15, 15. A shape retention member 16 formed of a rough blanket extends across the front surface of the air bag module M to a left side of the vehicle body through a widthwise intermediate portion of the seat back 2 and is connected to a pipe frame (not shown) on the left side of the vehicle body. A meshed spring 17 is stretched on an inner periphery of the pipe frame 11, and a pad 19 formed of a sponge is mounted on a front surface of the shape retention member 16.

A central portion of a front surface of the seat back 2 is covered with a first covering member 20. Left and right opposite sides and an upper portion of the first covering member 20 are covered with a second covering member 21. Left and right opposite sides and an upper surface of the seat back 2 connected to the second covering member 21 are covered with a third covering member 22 and further, a rear surface of the seat back 2 is covered with a fourth covering member 23. And the first and second covering members 20 and 21 are sewn to each other at a sewn-portion 24, and the second covering member 21 and the third covering member 22 are sewn to each other at a sewn portion 25. A beading 26 is integrally formed in the sewn portion 25 by sewing. A clip 28 is provided at a tip end of a tongue piece 27 extending from the sewn portion 24, so that the first and second covering members 20 and 21 are maintained at a predetermined shape by locking the clip 28 to the spring 17. A clip 30 is provided at a tip end of a tongue piece 29 connected to a rear portion of the third covering member 22, so that the third covering member 22 is fixed by locking the clip 30 to the retainer 13.

The structure of the air bag module M will be described below with reference to FIGS. 2 to 6.

The retainer 31 made of a metal includes a body portion $31_1$ having a J-shaped section, and a pair of clamp portions $31_2$, $31_2$ extending from one side edge of the body portion $31_1$. A substantially cylindrical inflater 32 with a propellant filled therein is supported on a circular sectional portion formed by the body portion $31_1$ and the clamp portions $31_2$, $31_2$. The retainer 31 and the inflater 32 are accommodated so that they are wrapped in the base end of the folded air bag 4. The bolts 14, 14 are passed through the clamp portions $31_2$, $31_2$ and the body portions $31_1$ of the retainer 31 and a side plate 33 and fastened by nuts 34, 34, and further passed through the module mounting frame 12 and fastened by nuts 15, 15.

The retainer 31, the side plate 33, the inflater 32 and the folded air bag 4 are accommodated within a module case 35 which is monolithically formed of a synthetic resin. The module case 35 includes a tray-shaped case body 36 which opens rightwards of the vehicle body, and a lid 37 connected to a rear edge of the case body 36 through a hinge portion 38. Thus, the lid 37 is fixed to cover the opening of the case body 36 by locking five hooks $36_1$ provided at an upper edge, a front edge and a lower edge of the case body 36 into five hook locking bores $37_1$ provided in an upper edge, a front edge and a lower edge of the lid 37.

Figure 6:
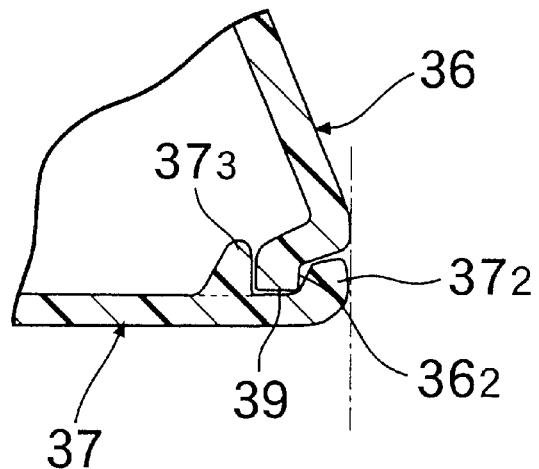

As can be seen from FIG. 6, a step $36_2$ is formed along an opened edge 39 of an outer periphery of the case body 36 to stand back from an outer surface of the case body 36, and a flange $37_2$ formed on an outer periphery of the lid 37 is fitted over an outer periphery of the step $36_2$. A large number of projections $37_3$ are formed on an inner surface of the front edge portion of the lid 37 to extend along the flange $37_2$, and the opened edge 39 of the case body 36 is fitted between the projections $37_3$ and the flange $37_2$. As a result, an outer surface of the case body 36 and an outer surface of the lid 37 are flush with each other without any difference in level therebetween in the vicinity of the opened edge 39 of the case body 36, so that a tip end of the flange $37_2$ of the lid 37 does not protrude outwardly from the case body 36, as shown by a dashed line in FIG. 6. Thus, it is possible to overcome the following disadvantage: When the weight of an occupant is applied to the seat back 2, causing the pad 19 and the third covering member 22 to be deformed or moved, they are caught on the flange $37_2$ of the lid 37 to permit the hooks $36_1$ to be disengaged from the hook locking bores $37_1$. Moreover, the opened edge 39 of the case body 36 is located in such a manner that it is fitted between the flange $37_2$ and the projections $37_3$ of the lid 37 and hence, it is possible to further reliably prevent the creation of a difference in level between the outer surface of the case body 36 and the outer surface of the lid 37 due to a load.

Figure 8:
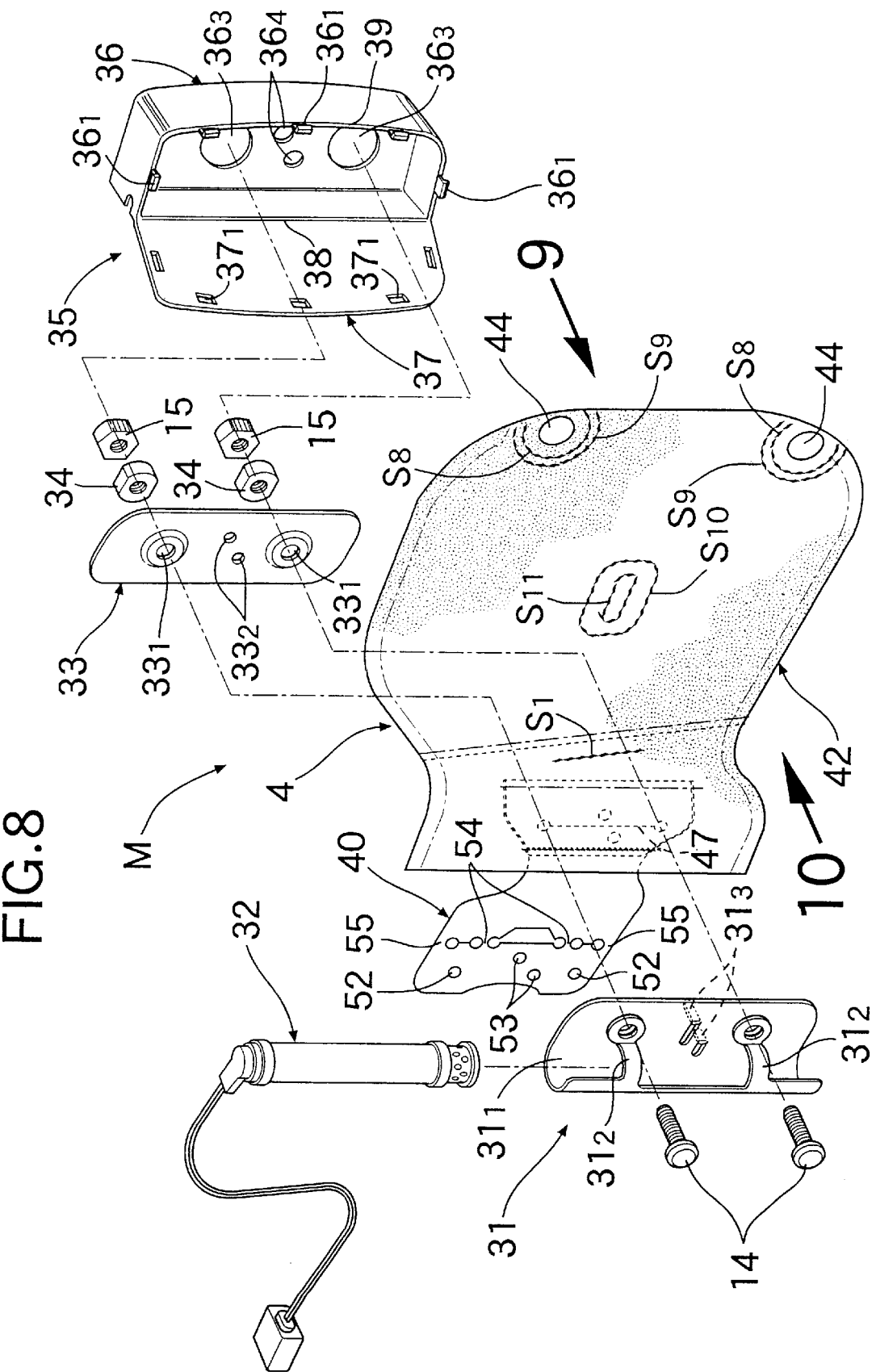

As shown in FIGS. 8 and 16, the air bag module M includes the air bag 4, the inflater 32, the retainer 31, the side plate 33, the module case 35, the bolts 14, 14, the nuts 34, 34 and the nuts 15, 15, and a protector sheet 40 is integrally affixed to the base end of the air bag 4 by sewing. The protector sheet 40 is formed of, for example, the same material as that of the air bag 40, such as a nylon fabric. The inflater 32, the retainer 31 and the bolts 14, 14 are previously assembled as a subassembly 41, and then, the subassembly 41 is inserted into the air bag 4 through a slit 47 which is defined in the base end of the air bag 4 and which will be described hereinafter.

The structures of the air bag 4 and the protector sheet 40 will be described with reference to FIGS. 9 to 16.

The air bag 4 is made by double-folding back a band-shaped base fabric 42, termed the "ground fabric" herein, along a folding line F at a lengthwise intermediate portion, superposing a reinforcing fabric 43 (see FIG. 11) onto an inner surface of a base end of the ground fabric, sewing the ground fabric 42 and the reinforcing fabric 43 to each other along three sewing lines $S_1$, $S_2$ and $S_3$, and sewing upper and lower edges of the double-folded ground fabric 42 to each other along two sewing lines $S_4$ and $S_5$ extending in parallel. The sewing lines $S_4$ and $S_5$ are for sewing the ground fabric 42 in an inside-out state, and the sewn ground fabric 42 is turned inside in through the slit 47.

The protector sheet 40 is sewed through the sewing line $S_6$ in a state in which its base end $40_1$ has been double-folded, and then, the double portion of the protector sheet 40 is superposed onto and integrally sewed to the base end of the ground fabric 42 through a sewing line $S_7$. The sewing line $S_6$ on the protector sheet 40 is for sewing using a thread thicker than threads for the other sewing lines $S_1$ to $S_5$ and $S_7$ to $S_{12}$ and hence, the sewed portion along the sewing line $S_6$ is raised largely from the surface of the protector sheet 40 (see FIGS. 4, 5 and 13).

Figure 9:
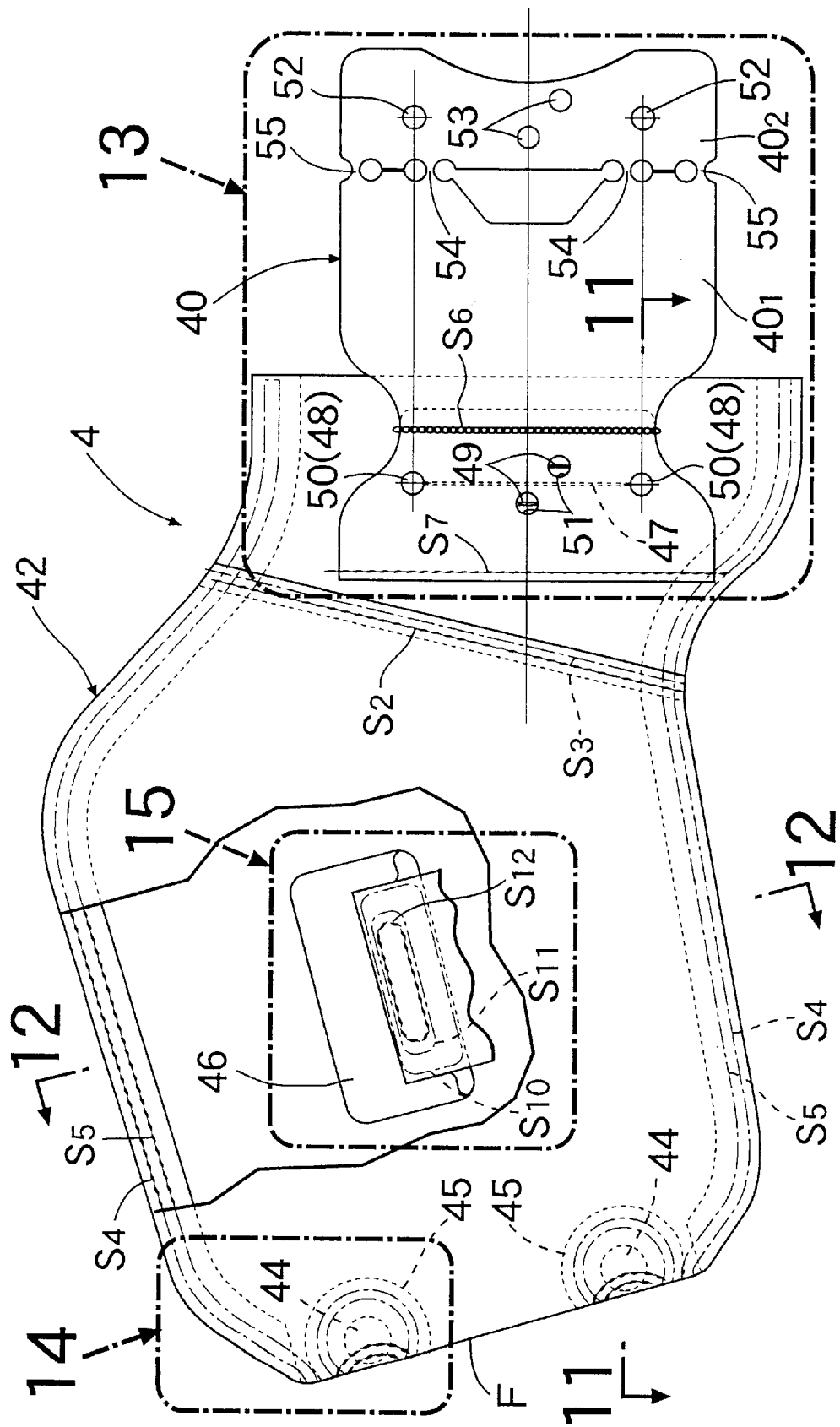
Figure 10:
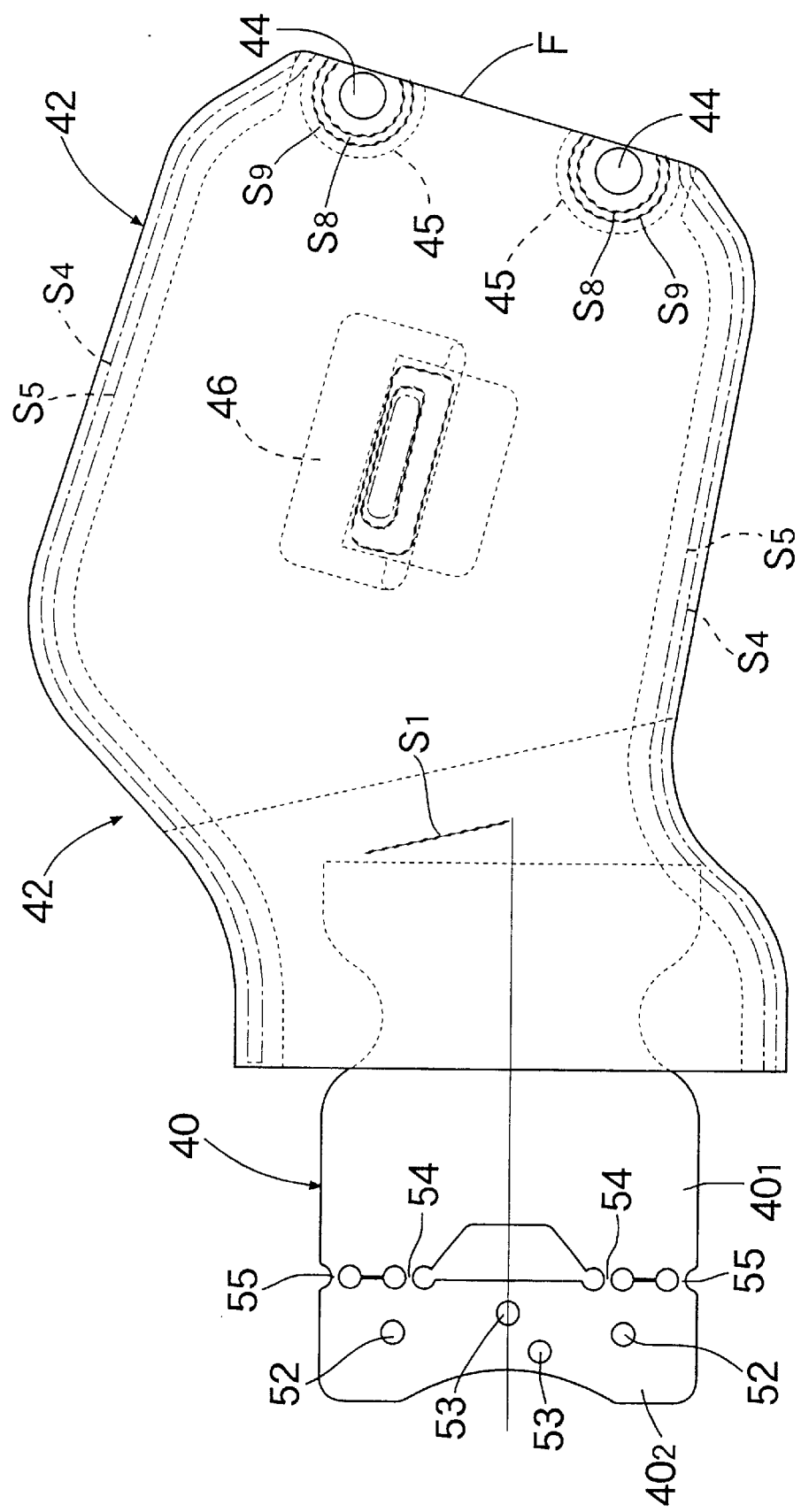
Figure 11:
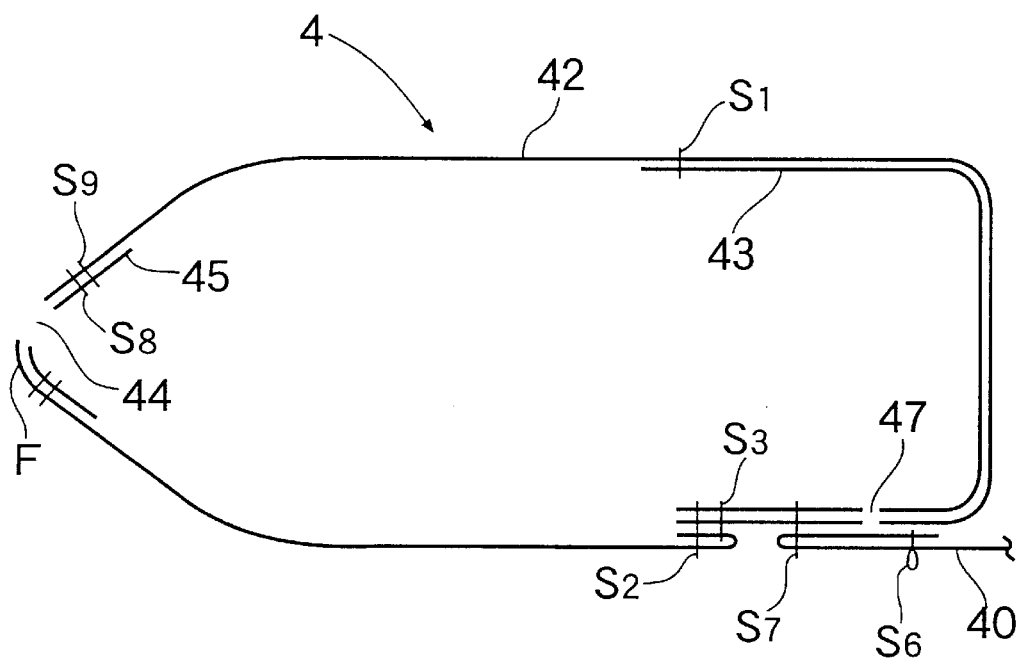
Figure 14:
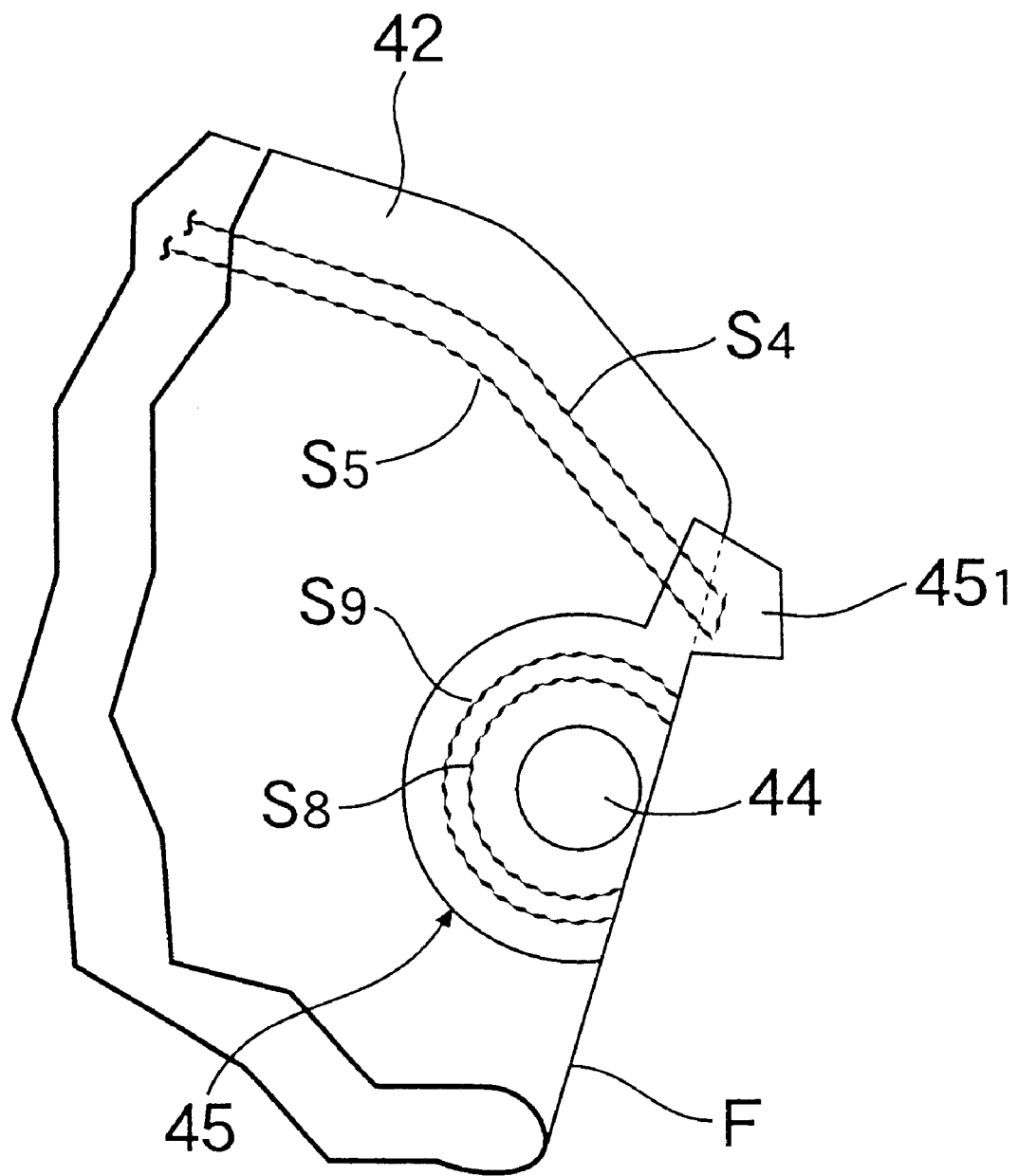

As can be seen from FIGS. 9, 10 and 14, two vent holes 44, 44 are defined in the tip end of the air bag 4 in the vicinity of the folding line F. the vent holes 44, 44 are located at an outer portion of the vehicle body (on a portion opposed to the center pillar and door on the opposite side from the occupant) in such a manner that it is slightly offset from the folding line F, taking it into consideration that a high-pressure gas from the bent holes 44, 44 does not collide against the occupant.

As best shown in FIG. 14, a substantially circular patch fabric 45 is superposed onto a back of the ground fabric 42 so as to surround each of the vent holes 44 and sewn thereto along sewing lines $S_8$ and $S_9$. FIG. 14 shows the ground fabric 42 in its inside-out state. The sewing of the patch fabric 45 along the sewing lines $S_8$ and $S_9$ is carried out at a stage before sewing of the ground fabric 42 along the sewing lines $S_4$ and $S_5$. A projection $45_1$ protruding from an outer periphery of the patch fabric 45 extends to become superposed in the vicinity of an end of the folding line F, and ends of the sewing lines $S_4$ and $S_5$ for sewing the upper and lower edges of the ground fabric 42 are interconnected in a U-shape on the projection $45_1$ protruding outwards from the folding line F, after integral sewing of the protrusion $45_1$ of the patch fabric 45 to the ground fabric 42.

In this way, by extending the sewing lines $S_4$ and $S_5$ beyond the folding line F, it is possible to overcome a disadvantage that a gap is produced in the ground fabric 42 in an area corresponding to the folding line F to cause the inside and outside of the air bag 4 to communicate with each other, and it is possible to reliably prevent the undesirable leakage of the high-pressure gas. Moreover, the projection $45_1$ is formed utilizing a portion of the patch fabric 45 for defining the vent holes 44, which can contribute to a reduction in the number of parts. In addition, the two sewing lines $S_4$ and $S_5$ are interconnected in the U-shape on the protrusion $45_1$ of the patch fabric 45 and hence, the sewing along the two sewing lines $S_4$ and $S_5$ can be carried out at one step, leading to a reduction in the number of steps.

Figure 12:
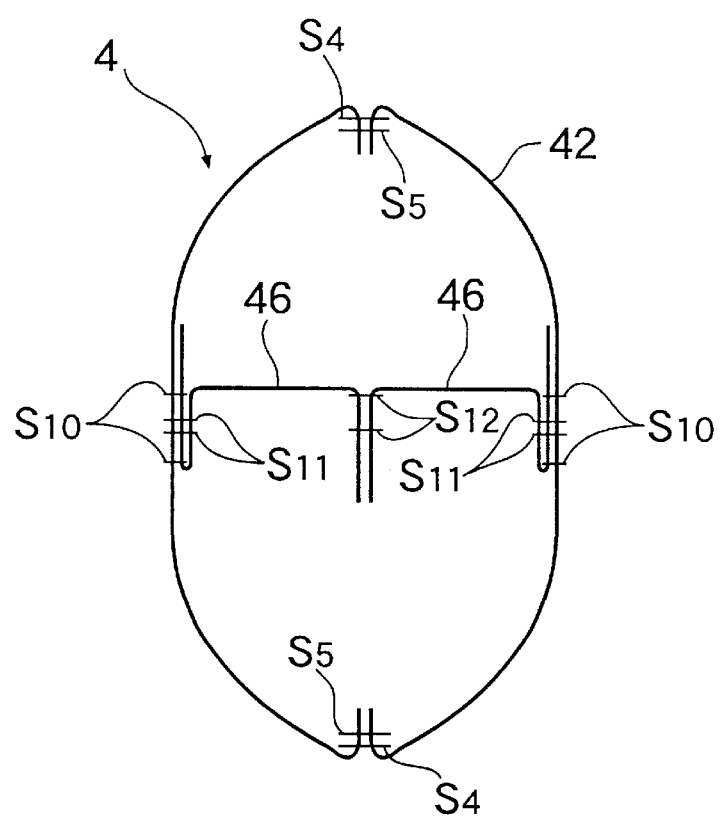
Figure 15:
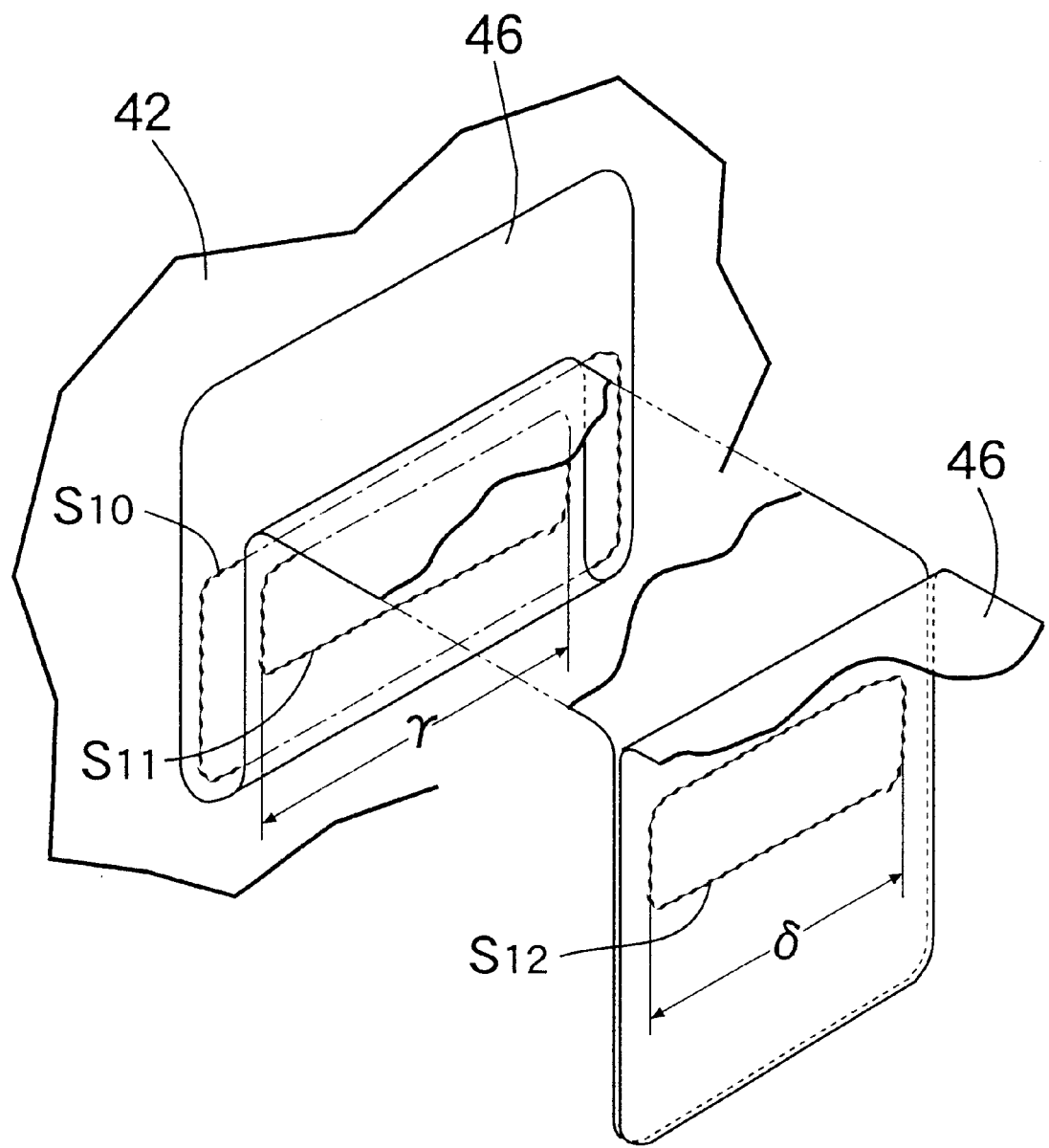

As shown in FIGS. 9, 12 and 15, the inner surfaces of the opposed portions of the double-folded ground fabric 42 are interconnected by tethers 46, 46. Each of the tethers 46, 46 is folded back at its base end to cover an annular sewing line $S_{10}$ after sewing of the ground fabric 42 along the annular sewing line $S_{10}$, and the double-folded tether 46 is further sewed together with the ground fabric 42 along a sewing line $S_{11}$. Tip ends of the two tethers 46, 46 are superposed on each other and sewed along a sewing line $S_{12}$. The sewing of the tethers 46, 46 along the sewing lines $S_{10}$ and $S_{11}$ is carried out at a stage before sewing of the ground fabric 42 along the sewing lines $S_4$ and $S_5$, and the sewing of the tethers 46, 46 along the sewing line $S_{12}$ to each other is carried out, before the ground fabric 42 sewed along the sewing lines $S_4$ and $S_5$ is turned inside in. Thus, when the air bag 4 is expanded, the tethers 46, 46 extend rectilinearly, as shown in FIG. 12, whereby the distance between the opposed portions of the ground fabric 42 of the air bag 4 can be limited to arrange the shape of the air bag 4 upon the completion of the expansion of the air bag 4.

Figure 13:
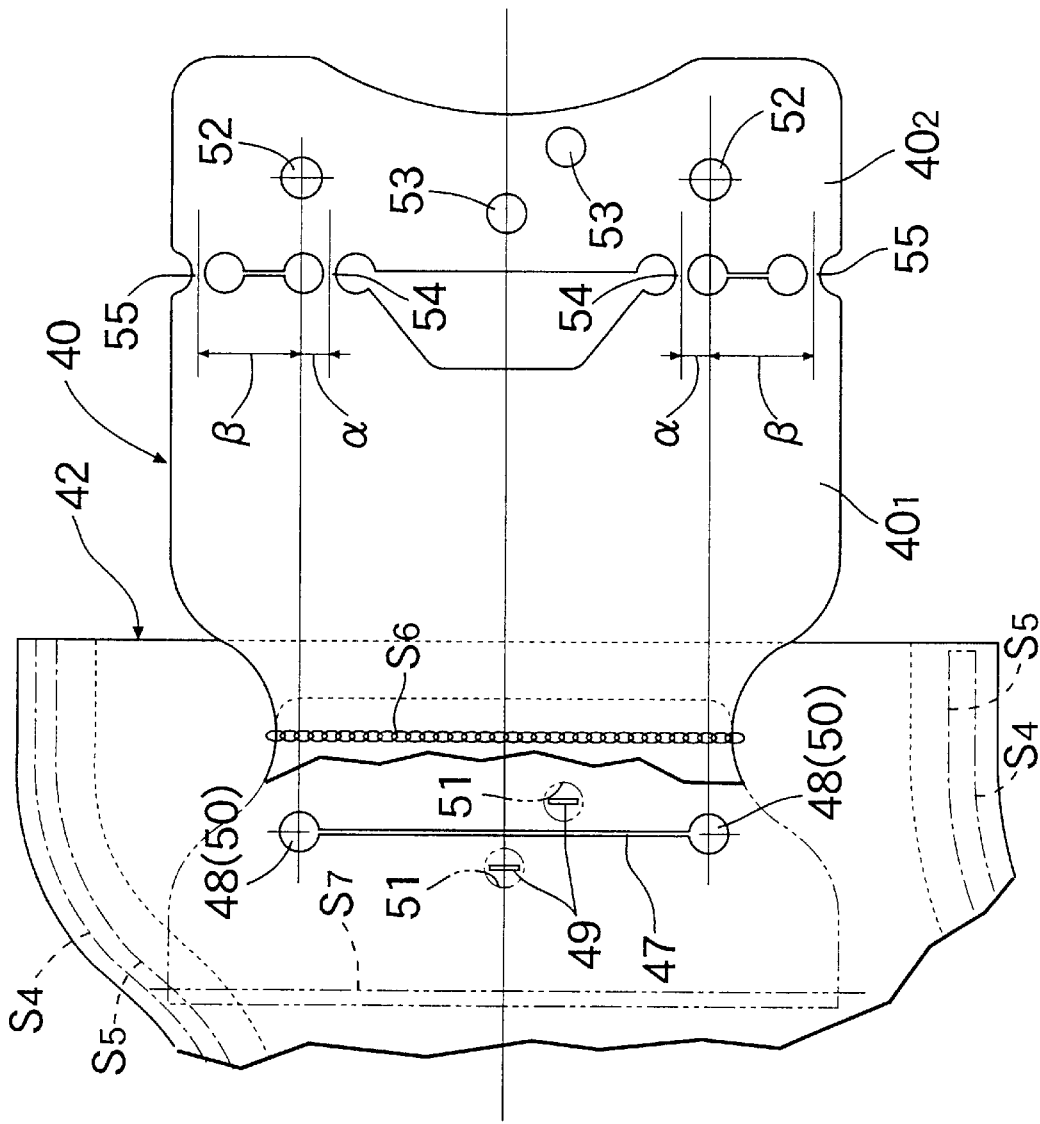

As shown in FIGS. 13 and 16, the slit 47 is defined rectilinearly at the base end of the air bag 4 to extend through the ground fabric 42 and the reinforcing fabric 43 (see FIG. 11), and two bolt bores 48, 48 for passing of the two bolts 14, 14 are defined at opposite ends of the slit 47. As described above, the slit 47 defined through the ground fabric 42 and the reinforcing fabric 43 is used for insertion of the subassembly 41 into the air bag 4, and the two bolts 14, 14 extending from the subassembly 41 inserted into the air bag 4 protrude to the outside of the air bag 4 from the bolt bores 48, 48 at the opposite ends of the slit 47.

Two linear pin bores 49, 49 are defined through the ground fabric 42 and the reinforcing fabric 43, so that two locating pins $31_3$ and $31_3$ formed in the retainer 31 in a cutting and rising manner are inserted through the pin bores 49, 49. Thus, the subassembly 41 inserted into the air bag 4 is located so that it is prevented from being turned upside down, by inserting the locating pins $31_3$, $31_3$ on the retainer 31 into the pin bores 49, 49.

Bolt bores 50, 50 and pin bores 51, 51 are defined in a base end $40_1$ of the protector sheet 40 superposed on the ground fabric 42 to cover the slit 47, so that they are aligned with the bolt bores 48, 48 and the pin bores 49, 49 in the air bag 4, respectively. Bolt bores 52, 52 and pin bores 53, 53 are also defined in tip ends $40_2$ of the protector sheet 40 superposed on the base end $40_1$ upon winding of the protector sheet 40 through approximately 360° around the outer periphery of the folded air bag 4, so that they are aligned with the bolt bores 50, 50 and the pin bores 51, 51 defined in the base end $40_1$. The pin bores 49, 49 in the ground fabric 42 and the reinforcing fabric 43 are defined rectilinearly, while the pin bores 51, 51; 53, 53 in the protector sheet 40 are defined into a circular shape larger than the rectilinear pin bores 49, 49.

As can be seen from FIG. 13, the base end $40_1$ and the top end $40_2$ of the protector sheet 40 are interconnected through four breakable portions 54, 54; 55, 55 formed thinly, so that they can be easily broken by a load. The two bolt bores 52, 52 are defined in the tip end $40_2$ of the protector sheet 40 at locations near the breakable portions 54, 54, 55, 55. The positional relationship between the bolt bores 52, 52 and the breakable portions 54, 54, 55, 55 is established as follows: When rectilinear lines are drawn in parallel to the lengthwise direction of the protector sheet 40 to extend through the centers of the bolt bores 52, 52, and two rectilinear lines are drawn in parallel to the lengthwise direction of the protector sheet 40 to extend through the centers of the breakable portions 54, 54, 55, 55, the centers of the bolt bores 52, 52 and the centers of the breakable portions 54, 54 are offset from each other by a distance α in the direction perpendicular to the lengthwise direction, and the centers of the bolt bores 52, 52 and the centers of the breakable portions 55, 55 are offset from each other by a distance β in the direction perpendicular to the lengthwise direction.

A procedure of assembling the air bag module M will be described below.

First, as shown in FIG. 16, the protector sheet 40 is turned in the direction of an arrow from a position indicated by a dashed line to a position indicated by a solid line and then, the slit 47 extending through the ground fabric 42 and the reinforcing fabric 43 (see FIG. 11) of the air bag 4 is opened, and the subassembly 41 comprising the inflater 32, the retainer 31 and the bolts 14, 14, which have been integrally assembled, is inserted into the air bag 4 through the slit 47. Then, the two bolts 14, 14 protruding from the retainer 31 of the subassembly 41 inserted into the air bag 4 are passed from the inside to the outside through the bolt bores 48, 48 defined in the opposite ends of the slit 47, and the two locating pins $31_3$, $31_3$ protruding from the retainer 31 are passed from the inside to the outside through the two linear pin bores 49, 49 extending through the ground fabric 42 and the reinforcing fabric 43 of the air bag 4.

During assembly, a harness connected to the inflater 32 is previously disconnected from the inflater 32 and accommodated within the ground fabric 42 with its opposite ends left to protrude to the outside from the slit 47 in the ground fabric 42 and a harness withdrawing bore (not shown) in the ground fabric 42. The base end of the harness protruding from the slit 47 is coupled to the inflater 32 and then, the inflater 32 is inserted into the ground fabric 42 through the slit 47. Thus, it is possible to easily carry out the operation of withdrawing the tip end of the harness from the harness withdrawing bore to the outside.

Subsequently, the protector sheet 40 is returned from the state shown in FIG. 16 to the state shown in FIG. 9, whereby the two bolt bores 50, 50 and the two pin bores 51, 51 defined in the base end $40_1$ of the protector sheet 40 are fitted over the bolts 14, 14 and the locating pins $31_3$, $31_3$. As a result, the slit 47 extending through the ground fabric 42 and the reinforcing fabric 43 of the air bag 4 is covered and closed by the protector sheet 40. By utilizing the protector sheet 40 in the above manner, the slit 47 in the air bag 4 can be closed without use of a special closing member.

A procedure for folding the air bag 4 in a bellows-shaped fashion from the tip end toward the base end will be described below with reference to FIGS. 17 to 22.

Figure 19:
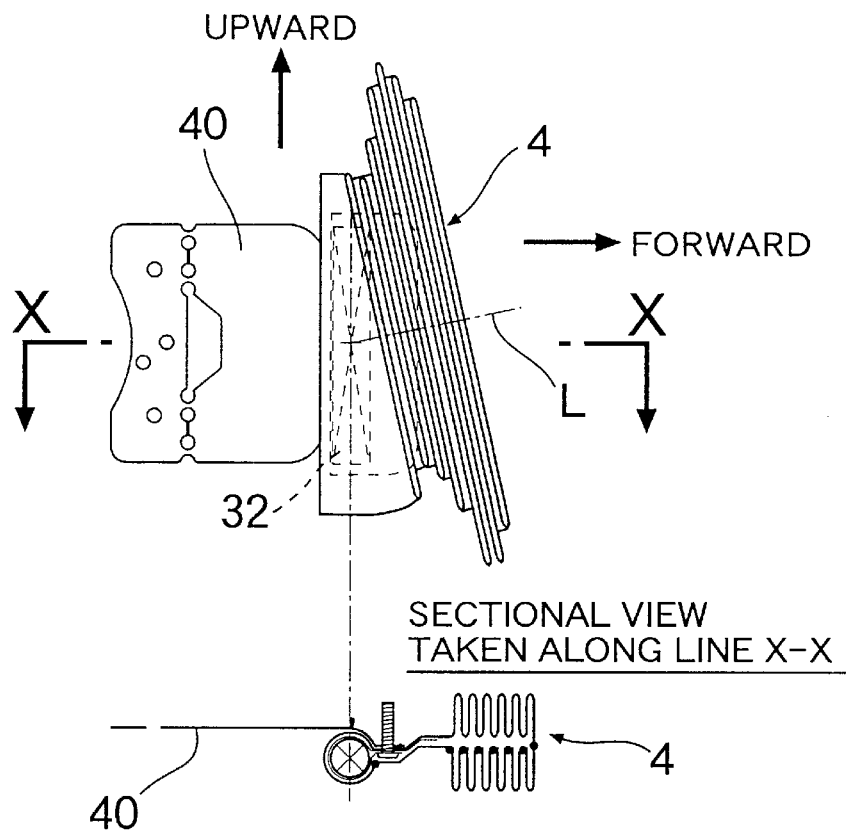

The air bag 4 unfolded in a state shown in FIG. 17 is folded in a bellows-shaped fashion from the tip end toward the base end as shown in FIGS. 18 and 19. In this case, folding lines $F_1$ to $F_7$ are established at predetermined distances in parallel to one another to intersect at right angles to the vertical center line L of the air bag 4. The tip end of the air bag 4 is flat, because no accommodated member is present therein. Therefore, the operation of folding the tip end along the folding lines $F_2$ to $F_7$ is automated by a machine. However, the base end of the air bag 4 is not flat in shape because the accommodated members, such as the inflater 32, are present therein and hence, it is difficult to automate the operation of folding the base end by a machine. For this reason, only the operation of folding the base end along the single folding line $F_1$ is carried out manually.

The manual folding operation is liable to provide a low accuracy, as compared with the automatically folding operation by a machine. To precisely fold the air bag 4, any mark is required, but the folding lines $F_1$ to $F_7$ are phantom, and it is not that they are actually drawn on the surface of the air bag 4. However, the sewing line $S_1$ for integrally sewing the ground fabric 42 and the reinforcing fabric 43 is disposed at the base end of the air bag 4 in parallel to the folding line $F_1$ and hence, it is possible to easily and precisely carry out the folding operation along the folding line $F_1$ with the sewing line $S_1$ used as a mark. In this way, the sewing line $S_1$ for sewing the ground fabric 42 and the reinforcing fabric 43 is used as the mark for the operation of folding the air bag 4 and hence, it is unnecessary to provide a special mark for the folding operation, whereby an increase in cost can be avoided.

Figure 20:
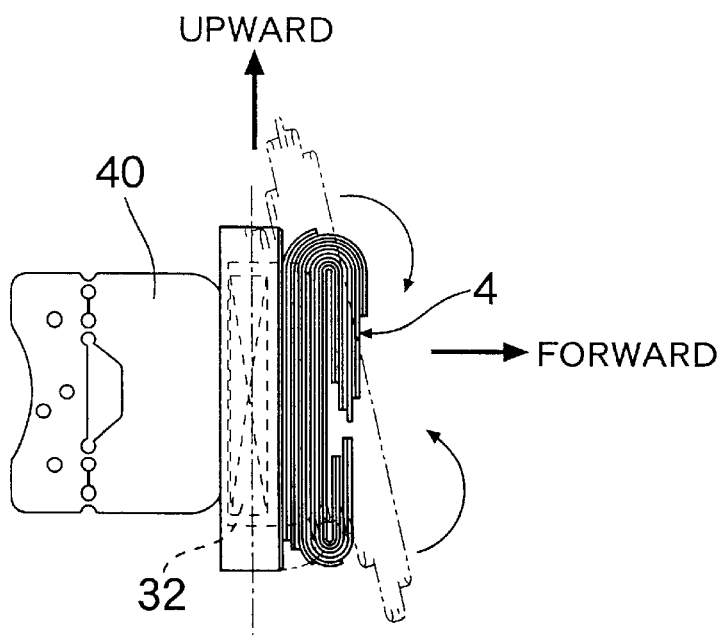
Figure 21:
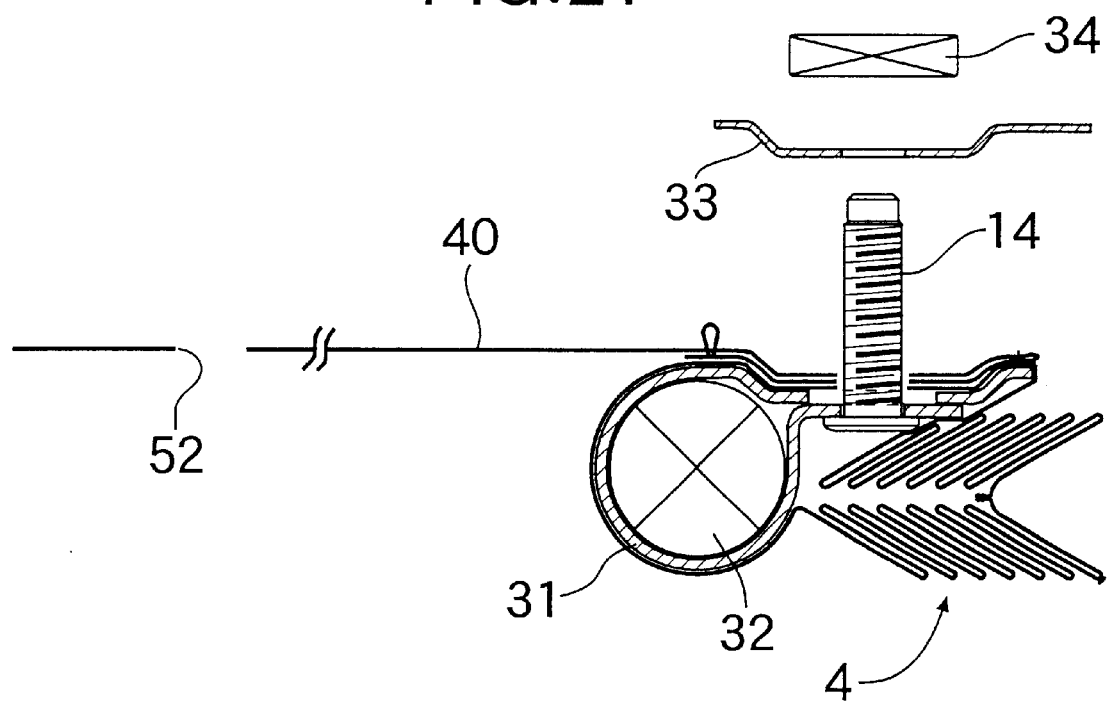
Figure 22:
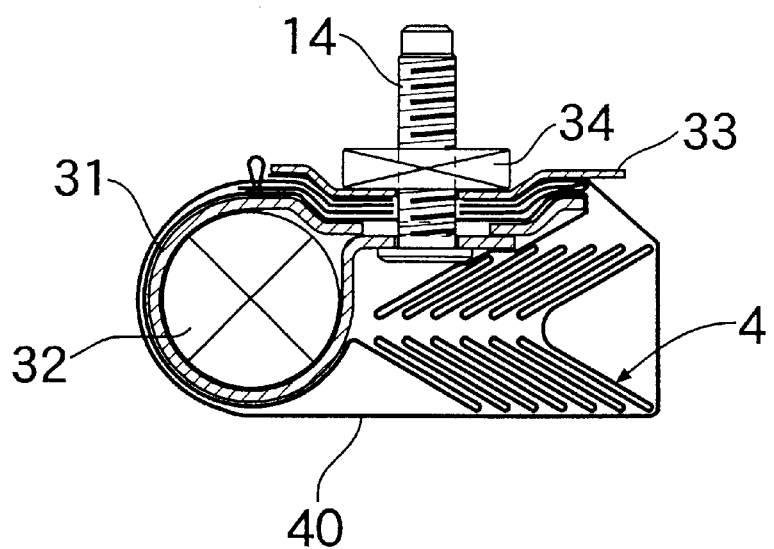

Subsequently, the upper and lower portions of the folded air bag 4 are folded upwardly and downwardly to decrease the vertical height of the air bag 4, as shown in FIG. 20. Then, lateral opposite halves of the folded air bag 4 are depressed, so that they are pressed down forwardly to decrease the lateral width, of the air bag 4, as shown in FIG. 21.

Then, as shown in FIGS. 4, 5, 9 and 22, the protector sheet 40 is wound in about one turn around the outer periphery of the folded air bag 4 and thereafter, the two bolt bores 52, 52 and the two pin bores 53, 53 defined in the tip end $40_2$ of the protector sheet 40 are fitted over the bolts 14, 14 and the locating pins $31_3$, $31_3$. As a result, the air bag 4 is wrapped in the protector sheet 40 and maintained in the folded state.

In this state, it is visually confirmed that the subassembly 41 has been correctly assembled with the two locating pins $31_3$, $31_3$ extending through the two linear pin bores 49, 49 in the air bag 4. At this time, because any of the pin bores 51, 51 in the base end $40_1$ and the pin bores 53, 53 in the tip end $40_2$ of the protector sheet 40 double-superposed outside the two linear pin bores 49, 49 are formed into circular shapes larger than the linear pin bores 49, 49, it is possible to easily confirm the assembled state of the subassembly 41 through the circular pin bores 51, 51; 53, 53 (see FIG. 5).

When the bolt bores 52, 52 in the tip end $40_2$ of the protector sheet 40 are to be fitted over the bolts 14, 14, it is necessary to strongly pull the tip end $40_2$ of the protector sheet 40 so as to compress the folded air bag 4, thereby applying a tensile force. At this time, the tensile force is transmitted from the base end $40_1$ of the protector sheet 40 through the four breakable portions 54, 54; 55, 55 to the tip end $40_2$. However, if the bolt bores 52, 52 in the tip end $40_2$ are disposed just in the vicinity of the breakable portions 54, 54; 55, 55, there is a possibility that a strong tensile force could be applied to the inner peripheries of the bolt bores 52, 52 fitted over the bolts 14, 14, thereby elongating or deforming the bolt bores 52, 52 to loosen the protector sheet 40.

According to the present embodiment, however, as can be seen from FIG. 13, the bolt bores 52, 52 are offset vertically by the distance $\alpha$ or the distance $\beta$ from the breakable portions 54, 54; 55, 55 and hence, it is possible to prevent a strong tensile force from being applied directly to the bolt bores 52, 52 to cause the elongation or the deformation. As a result, the folded air bag 4 can be wrapped and retained in the protector sheet 40 without looseness.

Figure 4:
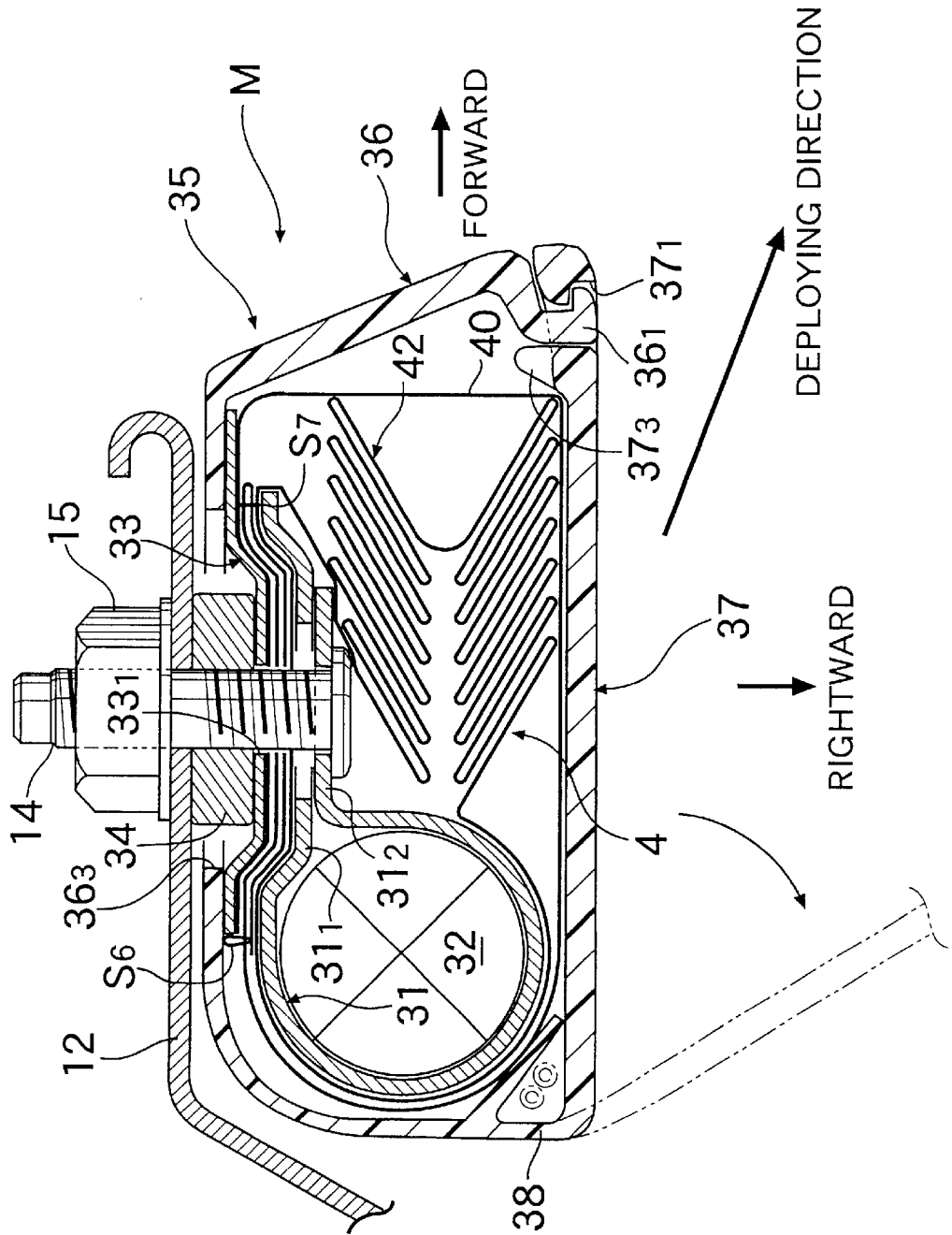

Subsequently, as shown in FIGS. 4 and 8, the bolts 14, 14 and the locating pins $31_3$, $31_3$ are fitted into the bolt bores $33_1$, $33_1$ and pin bores $33_2$, $33_2$ defined in the side plate 33 and thereafter, the nuts 34, 34 are threadedly placed over the bolts 14, 14. As a result, the air bag 4 and the protector sheet 40 are clamped between the retainer 31 and the side plate 33 and are firmly fixed. Therefore, the slit 47 extending through the ground fabric 42 and the reinforcing fabric 43 of the air bag 4 can be closed further reliably to prevent the leakage of high-pressure gas from the slit 47. In this state, the sewing line $S_6$ protruding on the surface of the protector sheet 40 is in abutment against the end edge of the side plate 33 (see FIGS. 4 and 5).

Then, the air bag 4 wrapped in the protector sheet 40 is accommodated into the case body 36 of the module case 35, and the hooks $36_1$ are brought into engagement in hook-engaging bores $37_1$ to fix the lid 37 in the closed position. At this time, the bolts 14, 14 and the locating pins $31_3$, $31_3$ are loosely fitted in the bolt bores $36_3$, $36_3$ and the pin bores $36_4$, $36_4$ defined in the bottom surface of the case body 36.

Then, the bolts 14, 14 are inserted through the module mounting frame 12 of the front seat S, and the nuts 15, 15 are threadedly engaged over the tip ends of the bolts 14, 14, thereby fixing the air bag module M to the module mounting frame 12. As can be seen from FIGS. 4 and 5, in a state in which the air bag module M has been fixed to the module mounting frame 12, the module case 35 made of a synthetic resin is not in contact with the module mounting frame 12, and the air bag module M is fixed with opposite surfaces of the module mounting frame 12 made of a metal being fastened by the two nuts 34, 34; 15, 15 made of a nut. At this time, if the module case 35 made of the synthetic resin is inserted and clamped to the module mounting frame 12, there is a possibility that the synthetic resin could be caved in due to a load to loosen the nuts 34, 34; 15, 15. In the present embodiment, however, a fastening force is not applied to the module case 35 made of the synthetic resin and hence, the above problem can be overcome.

If the inflater 32 generates a gas upon the collision of the vehicle, the air bag 4 is expanded within the module case 35. When the air bag 4 has been expanded, a tensile force is applied to the protector sheet 40 wrapping the outer periphery of the air bag 4 and hence, the breakable portions 54, 54; 55, 55 of the protector sheet 40 are broken to bring the air bag 4 into a state in which it can be expanded freely.

Figure 5:
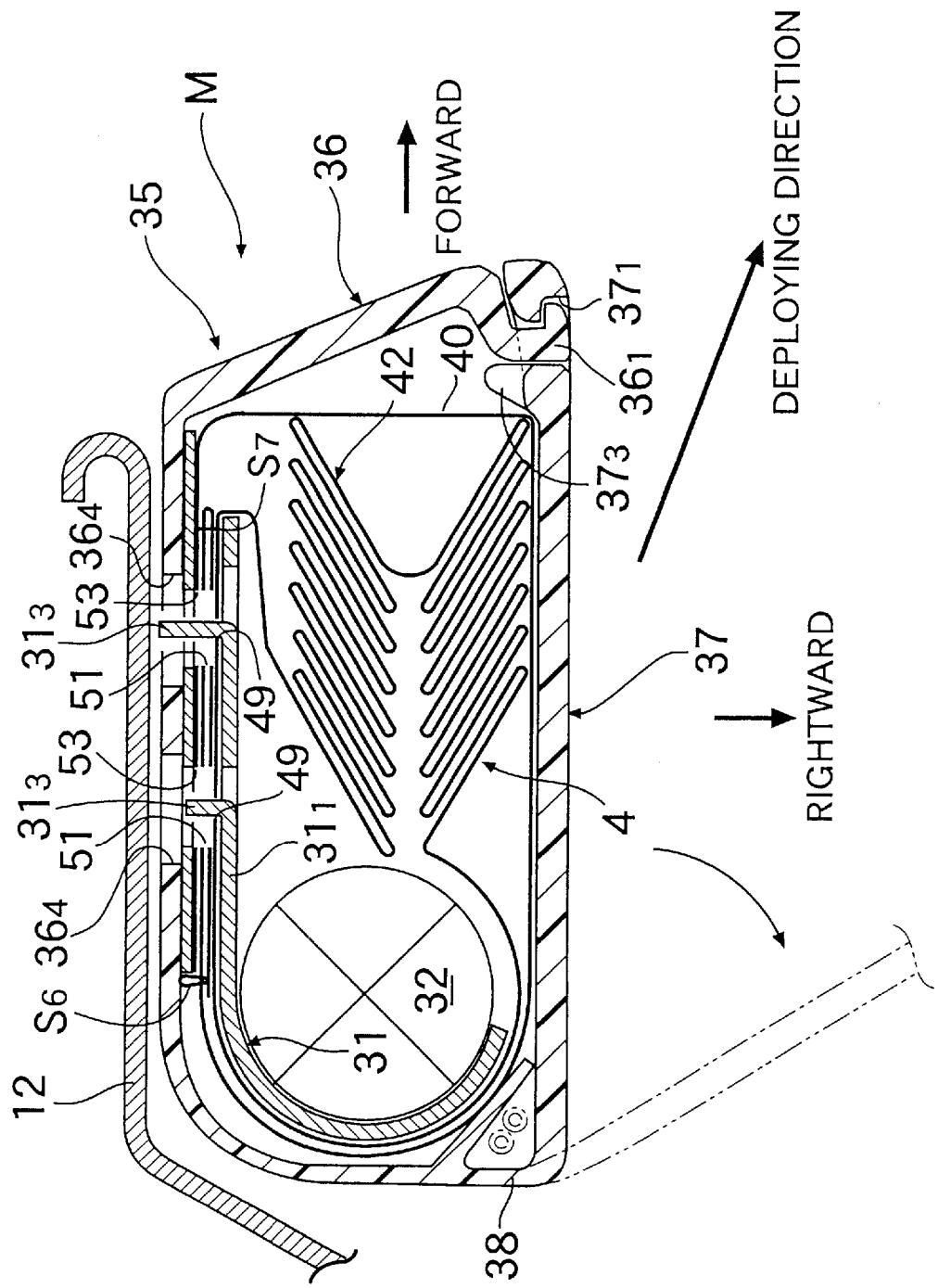

Even if the pressure of the high-pressure gas supplied into the air bag 4 acts to cause the base end of the air bag 4 to be misaligned relative to the retainer 31, the sewing line $S_6$ performs its part as a stopper, because the sewing line $S_6$ of the protector sheet 40 integral with the air bag 4 is in abutment against the end edge of the side plate 33 integral with the retainer 31, as shown in FIGS. 4 and 5. This makes it possible to prevent the misalignment of the air bag 4, and also to prevent a stress from being concentrated at the base end of the air bag 4. Moreover, a special stopper is not required, which can contribute to a reduction in the number of parts.

When the pressure of expansion of the air bag 4 is applied to the inner surface of the lid 37 for the module case 35, the hooks $36_1$ are disengaged from the hook-engaging bores $37_1$, thereby permitting the lid 37 to be rotated about the hinge portion 38 (see the dashed lines in FIGS. 4 and 5), whereby the case body 36 is opened.

Figure 7B:
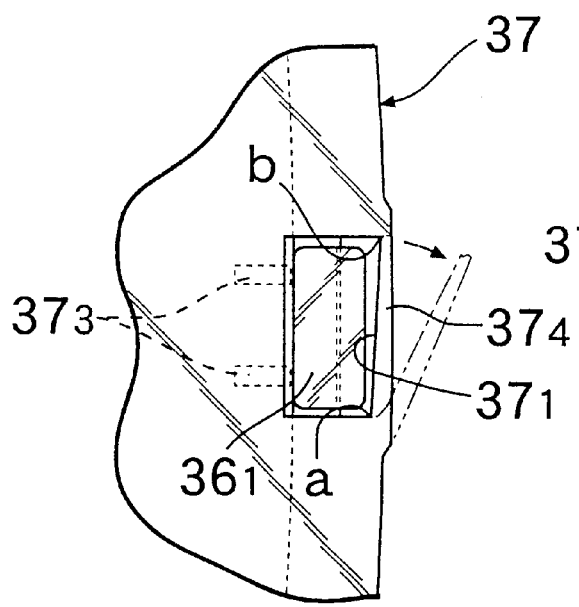
FIGS. 7A and 7B are enlarged views of a portion indicated by 7 in FIG. 3.
Figure 7A:
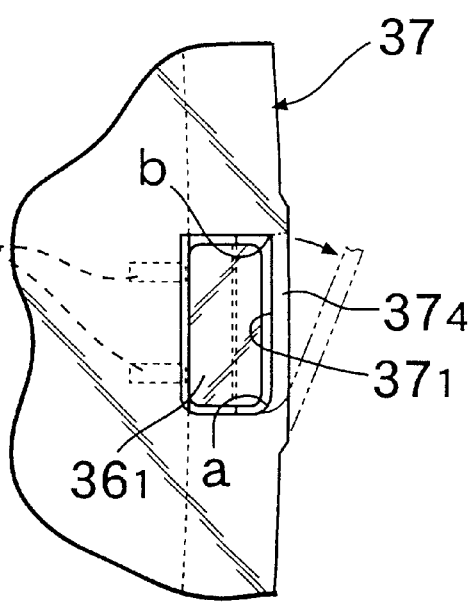

As can be seen from FIG. 7A, each of the hook-engaging bores $37_1$ defined in the lid 37 is formed into a substantially oblong shape with its long side extending in the direction along the outer peripheral edge of the lid 37. One corner a of two corners a and b of the hook-engaging bore $37_1$ facing opposite ends of an elongated bridge portion $37_4$ located between the outer peripheral edge of the lid 37 and the long side of the hook-engaging bore $37_1$ is formed into a smooth arcuate shape having a relatively large radius of curvature, but the other corner b is sharply pointed with a relatively small radius of curvature.

Therefore, when the hook-engaging bores $37_1$ are disengaged from the hooks $36_1$ to open the lid 37 from the case body 36 upon the expansion of the air bag 4, even when the corners a and b are broken, only the corner b, at which the stress is concentrated because it is sharply pointed, is broken, and the corner a cannot be broken. Thus, both the corners a and b are previously prevented from being broken together to cause the bridge portion $37_4$ to fly.

FIG. 7B shows another embodiment of the hook-engaging bore $37_1$. In this embodiment, a bridge portion $37_4$ facing one corner a of two corners a and b of the hook-engaging bore $37_1$ is formed at a large thickness, and a bridge portion $37_4$ facing the other corner b is formed at a small thickness. Even with this embodiment, the corner b having the small thickness is first broken, and the breaking of the corner a having the large thickness is avoided. Thus, both the corners a and b can be previously prevented from being broken together to cause the bridge portion $37_4$ to fly.

In FIG. 2, when the pressure of opening of the lid 37 is transmitted to the third covering member 22 of the seat back 2, the sewn portion 25 is broken, whereby the second and third covering members 21 and 22 are separated from each other, and the air bag 4 passed through the resulting clearance is deployed obliquely forwards to extend along the center pillar and the front door to hold back the right side of the occupant.

When the air bag 4 is expanded, the tethers 46, 46 are stretched rectilinearly to limit the lateral width of the air bag 4, as shown in FIG. 12. At this time, the base ends of the tethers 46, 46 are double-folded and superposed along with the ground fabric 42 of the air bag 4 into a three-layer pile and then sewn along the sewing line $S_{11}$. On the other hand, the tip ends of the tethers 46, 46 are superposed into a two-layer pile and sewn along the sewing line $S_{12}$. Moreover, the width Y of the sewing line $S_{11}$ at the base ends of the tethers 46, 46 is set larger than the width δ of the sewing line $S_{12}$ at the tip end of the tethers 46, 46 (see FIG. 15).

The strength of the sewing lines $S_{11}$ and $S_{12}$ comprising a closed curve is proportional to the magnitude of an area surrounded by the sewing lines $S_{11}$ and $S_{12}$. Therefore, the strength of the sewing line $S_{11}$ for sewing the base ends of the tethers 46, 46 to the ground fabric 42 is higher than the strength of the sewing line $S_{12}$ for sewing the tip ends of the tethers 46, 46 to each other. If the tethers 46, 46 should be broken by the tensile force, the sewing line $S_{11}$ is not broken, and the sewing line $S_{12}$ or the tethers 46, 46 themselves are broken. Thus, it is possible to reliably prevent the ground fabric 42 of the air bag 4 from being broken along with the sewing line $S_{11}$ to cause the leakage of the high-pressure gas. Moreover, the base ends of the tethers 46, 46 are merely double-folded, and a special reinforcing fabric is not required and hence, an increase in number of parts and an increase in cost can be suppressed.

Two tethers 46, 46 with the base ends sewn to the opposed inner surfaces of the ground fabric 42 are coupled by integral sewing at their tip ends in the above-described embodiment, but opposite ends of a single tether may be sewn to the opposed inner surfaces of the ground fabric 42. However, when the two separate tethers are used, the sewing operation is easier than in the case where the single tether is used.

Figure 23:
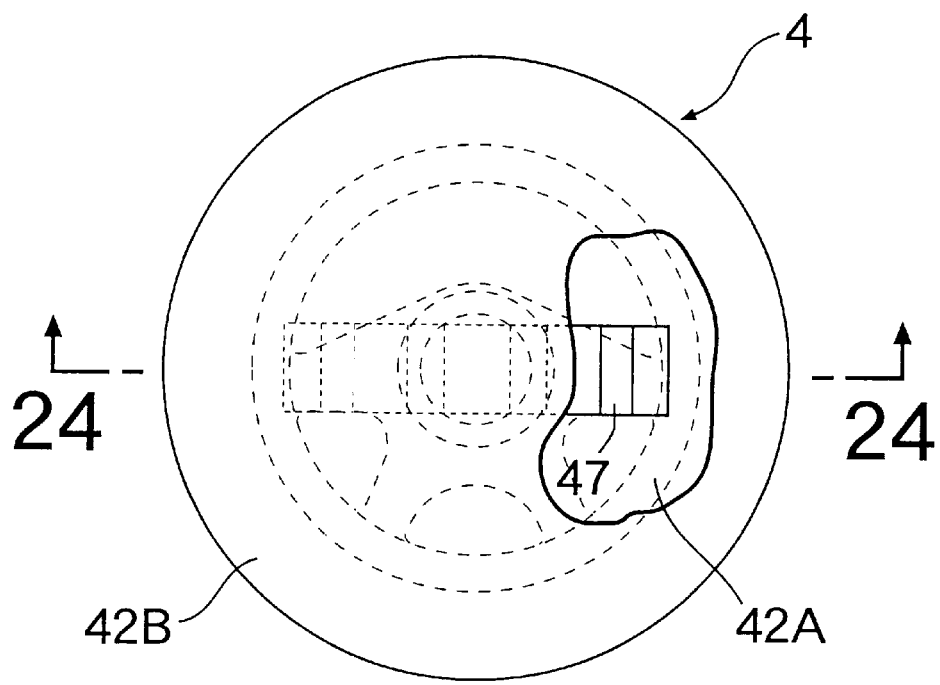
Figure 24:
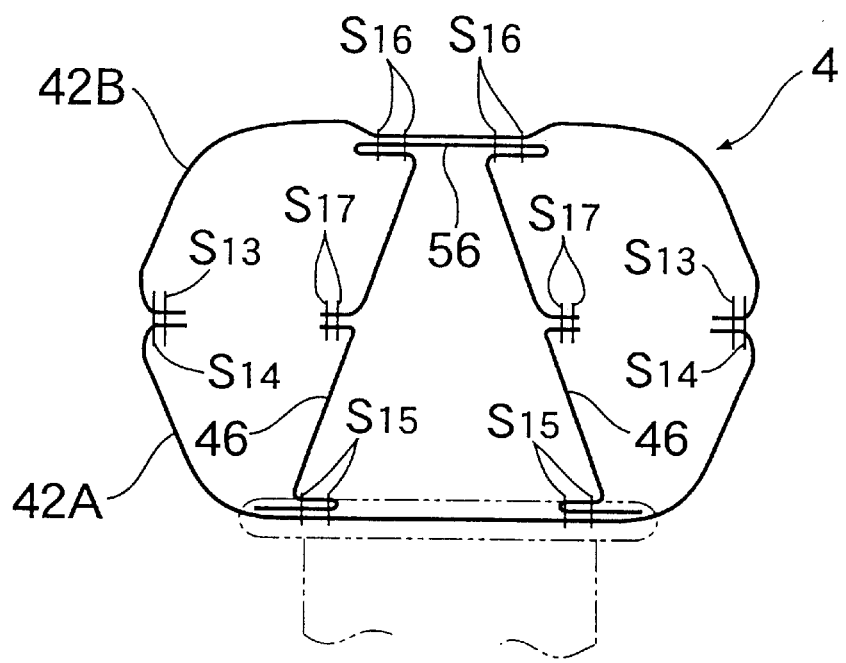

A second embodiment of the present invention will now be described with reference to FIGS. 23 and 24.

The second embodiment is intended for an air bag for a driver's seat, which is deployed from a central portion of a steering wheel into a vehicle compartment to hold back a driver. The air bag 4 is made by sewing a front ground fabric 42A and a rear ground fabric 42B to each other along sewing lines $S_{13}$ and $S_{14}$. Double-folded base ends of two tethers 46, 46 are sewn to an inner surface of the ground fabric 42A along a sewing line $S_{15}$, and a single tether 56 double-folded at two points in a central portion thereof is sewn to an inner surface of the ground fabric 42B at such two points along sewing lines $S_{16}$, $S_{16}$. Further, tip ends of the two tethers 46, 46 and opposite ends of the single tether 56 are sewn together along sewing lines $S_{17}$, $S_{17}$.

Even with the present embodiment, the tethers 46, 46 and 56 are double-folded at the sewing lines $S_{15}$, $S_{15}$, $S_{16}$, $S_{16}$, $S_{17}$, $S_{17}$ for sewing the tethers 46, 46 and 56 to the ground fabrics 42A and 42B, and hence, it is possible to reliably prevent the sewing lines $S_{15}$, $S_{15}$, $S_{16}$, $S_{16}$, $S_{17}$, $S_{17}$ from being broken by the internal pressure upon the expansion of the air bag 4 to break the ground fabrics 42A and 42B.

Although the embodiments of the present invention have been described in detail, it will be understood that the present invention is not limited to the above-described embodiments, and various modifications in design may be made without departing from the spirit and scope of the invention defined in claims.

For example, the air bag device used upon a side-collision and accommodated within the front seat S has been mainly described in the embodiments, but the present invention is also applicable to an air bag device for a driver's seat provided in a steering wheel and an air bag device for an assistant driver's seat provided in an instrument panel.

What is claimed is:

1. An air bag device for deployment to hold back an occupant upon collision of a vehicle, comprising:
   an inflater,
   an inflater retainer,
   an air bag being in a folded condition and having a base end forming a portion containing a slit through which said retainer and inflater are inserted into said air bag, and
   a breakable protector sheet disposed in wrapped engagement with an outer periphery of the folded air bag, said protector sheet extending across said slit in engagement with that portion of said air bag containing said slit, whereby said slit in said air bag is closed by sandwiching the portion of said air bag containing said slit between, and in contact with, said inflater retainer and said protector sheet, with said air bag in a region of said slit contacted on one side by said inflater retainer and on another side by the protector sheet.

2. An air bag device according to claim 1, further including a side plate disposed between a frame fixed to said vehicle and said protector sheet and being placed to abut against an outside surface of the protector sheet, and wherein the retainer, air bag, protector sheet and side plate are mutually superposed and fastened by a bolt and a nut to said frame.

3. An air bag device according to claim 2, wherein a sewing line sews the protector sheet integral with the air bag, said sewing line abutting against an end edge of said side plate, whereby the air bag is fixed relative to the retainer.

4. An air bag device according to either one of claim 2 or claim 3, wherein said inflater, said retainer, said protector sheet and said side plate are accommodated in a module case made of a synthetic resin to form a module, said bolt being inserted through said frame and being fastened thereto by said nut, and another nut secured to said bolt between said frame and said module case and being operative to space said module case from said frame.

5. An air bag device according to any one of claims 1 to 3, wherein said retainer has a locating pin projectingly provided thereon, said locating pin being fitted into a pin bore defined in said air bag, and a pin bore in said protector sheet to limit the orientation of mounting of said retainer relative to said air bag, said pin bore in said protector sheet being larger than said pin bore in said air bag.

6. An air bag device according to claim 4, wherein said retainer has a locating pin projectingly provided thereon, said locating pin being fitted into a pin bore defined in said air bag, and a pin bore defined in said protector sheet to limit the orientation of mounting of said retainer relative to said air bag, said pin bore in said protector sheet being larger than said pin bore in said air bag.

7. An air bag device comprising an air bag and an inflater for supplying a high-pressure gas to the air bag, said air bag being folded and being accommodated with said inflater in a module case including a case body which is openably and closably covered by a lid, a stepped portion formed about an outer periphery of said case body and adjacent an opened edge of said outer periphery of said case body to be offset inwardly from an outer surface of said case body, a flange formed along an outer periphery of said lid and being engageable with an outer periphery of said stepped portion, and a plurality of projections formed on a back of said lid in spaced relation with respect to said flange, said plurality of projections cooperating with said flange to define a space to receive an inner surface of the opened edge of said case body, whereby an outer surface of said lid is positioned flush with the outer surface of said case body in a state in which said lid has been closed.

8. An air bag device comprising an air bag and an inflater for supplying a high-pressure gas to the air bag, said air bag being folded and being accommodated with said inflater in a module case including a case body which is openably and closably covered by a lid, a stepped portion formed adjacent an opened edge of an outer periphery of said case body to be offset from an outer surface of said case body, a flange formed on an outer periphery of said lid and being engageable with an outer periphery of said stepped portion, and a projection formed on a back of said lid and cooperating with said flange to receive an inner surface of the opened edge of said case body, whereby an outer surface of said lid is positioned flush with the outer surface of said case body in a state in which said lid has been closed,
   wherein said case body has a hook provided adjacent said opened edge, and said lid has a hook-engaging bore defined along an outer periphery thereof, said hook being operative to engage said hook-engaging bore, said hook-engaging bore being substantially rectangular in shape to define a bridge portion deformable to the outside of said lid and wherein one of a pair or corners of said hook-engaging bore facing the outer periphery of said lid being formed so that it is more difficult to break than the other corner of said pair, whereby said bridge portion pivots outwardly about said one corner upon breaking of said other corner.

9. An air bag device according to claim 8, wherein said corners are each formed with a radius and wherein the radius of said one of said pair of corners is set larger than that of the other corner of said pair.

10. An air bag device according to claim 8, wherein a thickness distance of said bridge portion at one of said pair of corners being larger than at the other corner to effect pivoting of said bridge portion upon separation thereof from said lid.

11. An air bag device comprising an air bag which is expanded by a high-pressure gas generated by an inflater upon collision of a vehicle to hold back an occupant, said air bag including a sewing line extending along overlapped end edges of folded halves of a ground fabric which is double-folded along a central folding line, said air bag device including a patch fabric superposed onto said ground fabric to cover at least a portion of the ground fabric in the vicinity of a tip end of said folding line, and said sewing line extending on said patch fabric beyond said folding line.

12. An air bag device according to claim 11, wherein the overlapped end edges of said folded halves of the ground fabric are sewn along two parallel sewing lines, said two sewing lines being connected to each other on a projection of said patch fabric which protrudes outwards from said folding line.

13. An air bag device according to claim 11 or 12, wherein said ground fabric has a vent hole provided in the vicinity of said folding line, and said patch fabric also serves as a reinforcing member for said vent hole.

14. An air bag device comprising an air bag which is expanded by a pressure gas generated by an inflater upon collision of a vehicle to hold back an occupant, comprising a reinforcing fabric superposed onto a base end of a ground fabric and being sewn to said ground fabric along a sewing line, wherein said sewing line provides a guide for folding of said fabric and is disposed in parallel to, but spaced from, a folding line along which said air bag is folded in a bellows-shaped fashion.

* * * * *